US011222379B2

(12) United States Patent
Merg et al.

(10) Patent No.: US 11,222,379 B2
(45) Date of Patent: Jan. 11, 2022

(54) METHODS AND SYSTEMS FOR AUTOMATICALLY GENERATING REPAIR ORDERS

(71) Applicant: Snap-On Incorporated, Kenosha, WI (US)

(72) Inventors: Patrick S. Merg, Hollister, CA (US); Roy Steven Brozovich, Campbell, CA (US)

(73) Assignee: Snap-on Incorporated, Kenosha, WI (US)

( * ) Notice: Subject to any disclaimer, the term of this patent is extended or adjusted under 35 U.S.C. 154(b) by 192 days.

(21) Appl. No.: 15/380,377

(22) Filed: Dec. 15, 2016

(65) Prior Publication Data
US 2018/0174221 A1    Jun. 21, 2018

(51) Int. Cl.
*G06Q 30/06* (2012.01)
*B60R 16/023* (2006.01)
(Continued)

(52) U.S. Cl.
CPC ..... *G06Q 30/0633* (2013.01); *B60R 16/0234* (2013.01); *G06Q 10/10* (2013.01);
(Continued)

(58) Field of Classification Search
CPC .... G06Q 30/0633; G06Q 10/20; G06Q 50/30; G06Q 10/10; B60R 16/0234
See application file for complete search history.

(56) References Cited

U.S. PATENT DOCUMENTS 5,657,233 A * 8/1997 Cherrington .......... G01M 15/05
                                                        702/170
6,301,531 B1  10/2001 Pierro et al.
(Continued)

FOREIGN PATENT DOCUMENTS

CA      2844926 A1 *  9/2014
EP      1953617 A2    8/2008
WO   2015100228 A1    7/2015

OTHER PUBLICATIONS

John Huh, "FAQ: How to Identify Your Honda ECU" Pro Street Online, Oct. 4, 2013, accessed Nov. 15, 2021, https://my.prostreetonline.com/2013/10/04/faq-how-to-identify-your-honda-ecu/ (Year: 2013).*
(Continued)

*Primary Examiner* — Paul R Fisher
*Assistant Examiner* — Andrew Chase Lakhani
(74) *Attorney, Agent, or Firm* — McDonnell Boehnen Hulbert & Berghoff LLP

(57) ABSTRACT

A processor may receive, from one or more electronic control units (ECUs) of a particular vehicle, vehicle-system data including information about a state of one or more vehicle-systems of the particular vehicle. Also, the processor may receive, from one or more data sources other than the one or more ECUs, other input data indicative of a state of the particular vehicle. Based on the vehicle-system data and on the other input data, the processor may determine repair information to be specified in a repair order (RO) associated with the particular vehicle. Further, the processor may generate an RO specifying at least the determined repair information, wherein the generated RO is associated with the particular vehicle. Then, the processor may direct a display device to display at least one visual indication representative of the generated RO.

34 Claims, 8 Drawing Sheets

(51) Int. Cl.
  *G07C 5/00* (2006.01)
  *G06Q 10/10* (2012.01)
  *G06Q 10/00* (2012.01)
  *G06Q 50/30* (2012.01)

(52) U.S. Cl.
  CPC ............. *G06Q 10/20* (2013.01); *G07C 5/008* (2013.01); *G06Q 50/30* (2013.01)

(56) References Cited

U.S. PATENT DOCUMENTS

| | | | | |
|---|---|---|---|---|
| 6,505,776 | B1* | 1/2003 | Wilz, Sr. | H04L 67/12 |
| | | | | 235/462.01 |
| 6,636,790 | B1* | 10/2003 | Lightner | G01M 15/102 |
| | | | | 701/31.5 |
| 6,946,978 | B2 | 9/2005 | Schofield | |
| 6,957,133 | B1* | 10/2005 | Hunt | B60R 25/102 |
| | | | | 701/32.4 |
| 7,228,211 | B1* | 6/2007 | Lowrey | G07C 5/008 |
| | | | | 701/31.5 |
| 7,619,650 | B2 | 11/2009 | Bothe et al. | |
| 7,945,438 | B2 | 5/2011 | Balmelli et al. | |
| 8,977,423 | B2* | 3/2015 | Merg | G07C 5/008 |
| | | | | 701/31.4 |
| 9,036,040 | B1* | 5/2015 | Danko | G06T 5/009 |
| | | | | 348/222.1 |
| 9,487,235 | B2 | 11/2016 | Bajpai et al. | |
| 9,672,497 | B1* | 6/2017 | Lewis | G06F 17/277 |
| 9,715,769 | B2 | 7/2017 | Chundrlik, Jr. et al. | |
| 2002/0007237 | A1* | 1/2002 | Phung | G05B 23/0216 |
| | | | | 701/31.4 |
| 2002/0007289 | A1* | 1/2002 | Malin | G06Q 10/06 |
| | | | | 705/4 |
| 2002/0073000 | A1 | 6/2002 | Sage | |
| 2002/0133273 | A1* | 9/2002 | Lowrey | G01M 15/04 |
| | | | | 701/29.4 |
| 2002/0156692 | A1* | 10/2002 | Squeglia | G06Q 10/087 |
| | | | | 705/26.81 |
| 2004/0148188 | A1* | 7/2004 | Uegaki | G06Q 10/10 |
| | | | | 705/305 |
| 2005/0131585 | A1* | 6/2005 | Luskin | H04L 67/34 |
| | | | | 701/1 |
| 2007/0088472 | A1* | 4/2007 | Ganzhorn, Jr. | G01M 15/102 |
| | | | | 701/31.4 |
| 2008/0004764 | A1* | 1/2008 | Chinnadurai | G05B 23/0235 |
| | | | | 701/31.4 |
| 2008/0208609 | A1* | 8/2008 | Preece | G06Q 10/06 |
| | | | | 705/1.1 |
| 2008/0243488 | A1* | 10/2008 | Balmelli | G06F 17/271 |
| | | | | 704/10 |
| 2008/0306651 | A1 | 12/2008 | Davis | |
| 2009/0216399 | A1* | 8/2009 | Ishikawa | G07C 5/0808 |
| | | | | 701/31.4 |
| 2012/0215491 | A1* | 8/2012 | Theriot | G07C 5/0808 |
| | | | | 702/183 |
| 2013/0231920 | A1* | 9/2013 | Mathew | G06F 17/27 |
| | | | | 704/9 |
| 2013/0297143 | A1* | 11/2013 | Chen | G06Q 10/20 |
| | | | | 701/29.6 |
| 2013/0317694 | A1* | 11/2013 | Merg | G07C 5/008 |
| | | | | 701/31.6 |
| 2014/0195099 | A1* | 7/2014 | Chen | G06F 16/2448 |
| | | | | 701/29.6 |
| 2014/0207771 | A1* | 7/2014 | Merg | G06F 16/316 |
| | | | | 707/731 |
| 2014/0279718 | A1* | 9/2014 | Southey | G06N 5/04 |
| | | | | 706/11 |
| 2014/0309853 | A1 | 10/2014 | Ricci | |
| 2014/0325254 | A1* | 10/2014 | Mani | G06F 16/285 |
| | | | | 714/2 |
| 2014/0374475 | A1* | 12/2014 | Kallfelz | G01R 31/367 |
| | | | | 235/375 |
| 2015/0094905 | A1 | 4/2015 | Frashure | |
| 2015/0287318 | A1* | 10/2015 | Nair | G08C 17/02 |
| | | | | 340/5.52 |
| 2016/0093122 | A1* | 3/2016 | Chen | G07C 5/0808 |
| | | | | 701/29.6 |
| 2016/0171802 | A1 | 6/2016 | Fountain | |
| 2017/0308640 | A1* | 10/2017 | Brelje | G06F 17/5086 |

OTHER PUBLICATIONS

International Search Report and Written Opinion for corresponding PCT application No. PCT/US2017/065721 dated Feb. 16, 2018.

* cited by examiner

RTR Car Repair, Tuscaloosa, Alabama — 402
February 18, 2009 — 404

Customer: C. N. Saban — 406
Vehicle: 1997 Ford Crown Vic. 4.6L, V8, (W), Auto Trans. — 408, 432
Complaint: Failed emissions test. Check engine light on. Change oil and filter. — 410, 412, 414
VIN: 1GYSP74WXVR123456

Service procedure:

| | Time | Rate | Cost |
|---|---|---|---|
| Check DTC – P0171 and P0174. (C45) — 424 | 0.3 | $100 | $30 |
| Check system vacuum and fuel pressures 30/40 PSI. (C117, C245) MAF readings bad. (C772) | 0.5 | $100 | $50 |
| Cleaned MAF, retested, recalibrated MAF. Verify repair. (C415, R550) | 1.0 | $100 | $100 |
| Change engine oil and filter. (C085) — 426 | 0.2 | $100 | $20 |
| Lubricate chassis. (C086) | 0.5 | $50 | $25 |
| Check DTC. Diagnose DTC 117. (C100) — 428 | 0.2 | $50 | $10 |
| Coolant sensor short. R/R coolant sensor. (R199) | 0.4 | $100 | $40 |
| Verify repair. (V18) — 422 | 0.4 | $100 | $40 |
| | 0.2 | $100 | $20 |

| Part Description | Part # | Price |
|---|---|---|
| MAF sensor | 6012980 | $89.99 |
| Oil Filter | 6043011 | $19.99 |
| ECT sensor | 6563772 | $73.99 |

Sub-total  $183.97
Labor     $335.00
Tax        $51.90
Total     $570.87 — 416

Mileage: 23,411 — 430

| | |
|---|---|
| 502 → RO ID: 3915  Repair year 2009 Y/M/M/E: 1997/Ford/Crown Victoria/4.6L, V8, VIN (W) ← 504, 506 | |
| Work Requested: Customer states the vehicle has failed state emissions certification. Please diagnose and advise.  Customer states please replace the MAF sensor.  508 | |
| Work Performed: Technician scan tested and verified the DTC P0171 and DTC P0174. Tested for vacuum leaks and found none at the time.  Tested the fuel pump pressure found [[30]] PSI and [[40]] PSI unregulated.  Checked the scan data.  Found the MAF sensor readings incorrectly.  Removed the MAF sensor and cleaned.  Found the MAF sensor is not damaged.  Recommend recalibration of MAF sensor.  Recalibrated MAF sensor.  Found the MAF sensor readings correctly.  510 | |
| Meta-data: Customer complaint: failed state emissions certification<br>Pcode: P0171, P0174<br>Component: mass airflow sensor (MAF) (MAF sensor)  512 | |
| Usage indicator: Distance = 23,411 miles  514 | |

METHODS AND SYSTEMS FOR AUTOMATICALLY GENERATING REPAIR ORDERS

INCORPORATION BY REFERENCE

U.S. patent application Ser. No. 14/270,994, filed on May 6, 2014, is incorporated herein by reference, as if fully set forth in this description.

BACKGROUND

Many products produced by manufacturers occasionally have to be repaired. Many owners are unequipped or otherwise unable to repair certain products. Such owners may depend on professional repair technicians to service or repair the owner's product.

The repair technicians typically repair products at a product repair shop. A repair shop has traditionally produced a repair order (RO) to capture a variety of information regarding a request for servicing or repairing a product. As an example, the captured information can include information identifying the product, the product's owner, the repair shop, the date of repair, and the type of repair or service needed or performed. The RO can exist in various formats such as a paper format or an electronic format.

Product manufacturers use a significant amount of resources (e.g., human and financial) to generate repair information, such as repair manuals and technical service bulletins, that repair technicians can reference while diagnosing and repairing a product. It may be beneficial to product manufacturers if repair orders can be generated automatically by a computing system.

Overview

Example implementations are described herein. In one aspect, a method is disclosed. The method involves receiving, by at least one processor from one or more electronic control units (ECUs) of a particular vehicle, vehicle-system data including information about a state of one or more vehicle-systems of the particular vehicle. The method also involves receiving, by the at least one processer from one or more data sources other than the one or more ECUs, other input data indicative of a state of the particular vehicle. The method additionally involves, based on the vehicle-system data and on the other input data, determining, by the at least one processor, repair information to be specified in a repair order (RO) associated with the particular vehicle. The method further involves generating, by the at least one processor, an RO specifying at least the determined repair information, where the generated RO is associated with the particular vehicle. The method yet further involves directing, by the at least one processor, a display device to display at least one visual indication representative of the generated RO.

In another aspect, a computing system is disclosed. The computing system includes at least one processor. The computing system also includes a computer-readable medium. The computer system additionally includes program instruction stored on the computer-readable medium and executable by the at least one processor to receive, from one or more electronic control units (ECUs) of a particular vehicle, vehicle-system data including information about a state of one or more vehicle-systems of the particular vehicle. The program instructions are also executable to receive, from one or more data sources other than the one or more ECUs, other input data indicative of a state of the particular vehicle. The program instructions are additionally executable to, based on the vehicle-system data and on the other input data, determine repair information to be specified in a repair order (RO) associated with the particular vehicle. The program instructions are further executable to generate an RO specifying at least the determined repair information, where the generated RO is associated with the particular vehicle. The program instructions are yet further executable to direct a display device to display at least one visual indication representative of the generated RO.

In yet another aspect, a computer-readable medium is disclosed. The computer-readable medium has stored thereon instructions executable by at least one processor to cause a computing system to perform operations. The operations involve receiving, from one or more electronic control units (ECUs) of a particular vehicle, vehicle-system data including information about a state of one or more vehicle-systems of the particular vehicle. The operations also involve receiving, from one or more data sources other than the one or more ECUs, other input data indicative of a state of the particular vehicle. The operations additionally involve, based on the vehicle-system data and on the other input data, determining repair information to be specified in a repair order (RO) associated with the particular vehicle. The operations further involve generating an RO specifying at least the determined repair information, where the generated RO is associated with the particular vehicle. The operations further involve directing a display device to display at least one visual indication representative of the generated RO.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the invention.

BRIEF DESCRIPTION OF THE DRAWINGS

Example embodiments are described herein with reference to the following drawings.

FIG. 4 shows an original repair order in accordance with one or more example embodiments.

FIG. 5 shows a presentable repair order in accordance with one or more example embodiments.

DETAILED DESCRIPTION

I. Introduction

Figure 1:
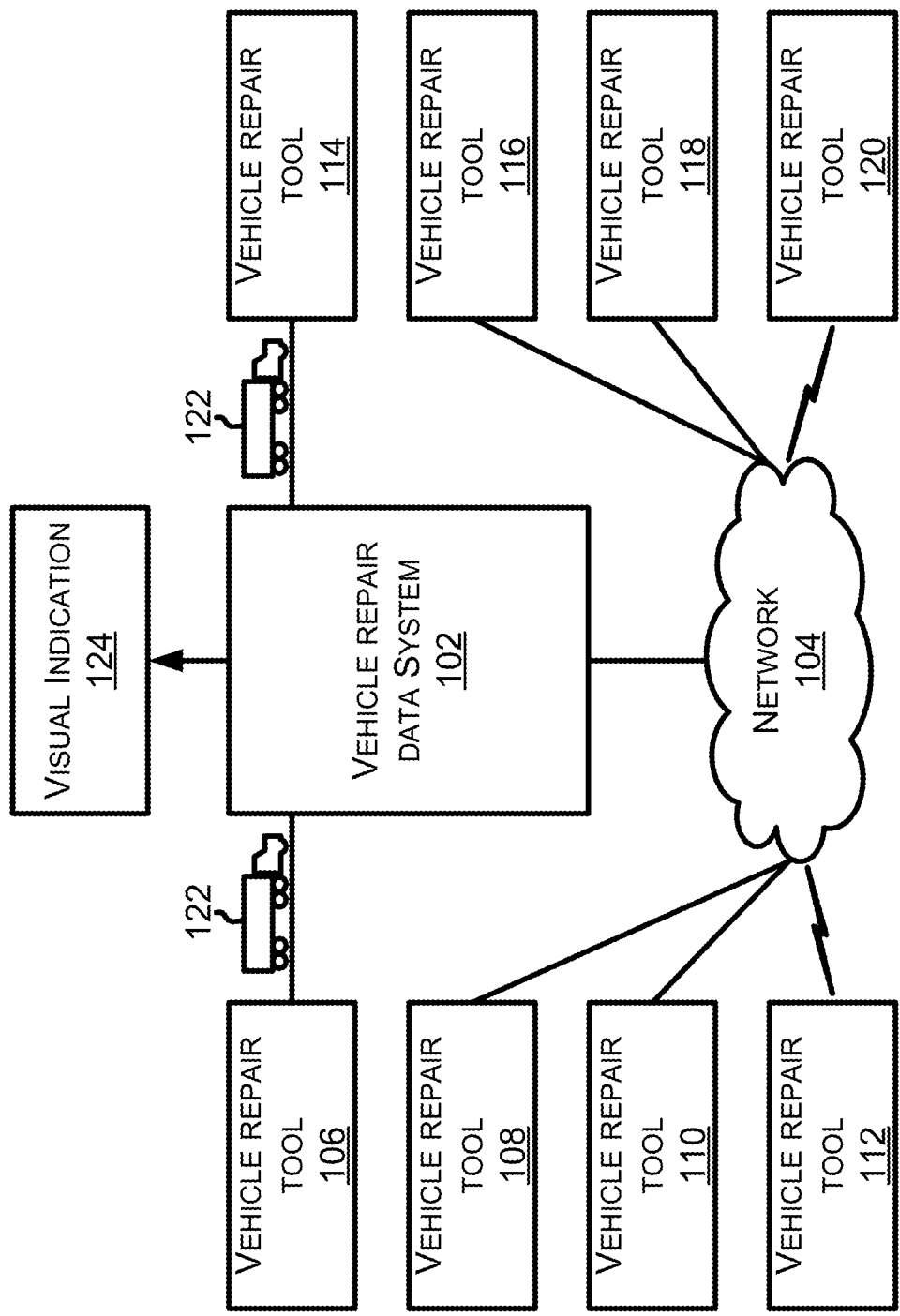
FIG. 1 is a block diagram of a system in accordance with one or more example embodiments.

This description describes several example embodiments including example embodiments regarding automatic generation of repair orders (ROs). At least some of the example embodiments include, but are not limited to include, one or more of the following features: (i) receiving, from one or more electronic control units (ECUs) of a particular vehicle, vehicle-system data including information about a state of one or more vehicle-systems of the particular vehicle, (ii) receiving, from one or more data sources other than the one or more ECUs, other input data indicative of a state of the particular vehicle, (iii) based on the vehicle-system data and on the other input data, determining repair information to be specified in a repair order (RO) associated with the particular vehicle, (iv) generating an RO specifying at least the determined repair information, where the generated RO is associated with the particular vehicle, and (v) directing a display device to display at least one visual indication representative of the generated RO.

A vehicle repair tool can include any of a variety of repair tools a repair technician, a product owner, a person working at a repair shop, or some other person can use to repair a vehicle. Repairing a vehicle can include, but is not limited to include, diagnosing a vehicle, servicing a vehicle, performing maintenance (e.g., preventive maintenance) on a vehicle, or verifying a repair performed on a vehicle to correct a vehicle malfunction. Accordingly, a vehicle repair tool can be referred to as one or more of the following terms: a vehicle diagnostic tool, a vehicle service tool, a vehicle maintenance tool, and a vehicle repair verification tool, or more generally, a machine.

A vehicle is a mobile machine that may be used to transport a person, people, or cargo. As an example, any vehicle described herein may be driven or otherwise guided along a path (e.g., a paved road or otherwise) on land, in water, or in the air or outer space. As another example, any vehicle described herein may be wheeled, tracked, railed or skied. As yet another example, any vehicle described herein may include an automobile, a motorcycle, a light-duty truck, a medium-duty truck, a heavy-duty truck, a semi-tractor, or a farm machine. As still yet another example, any vehicle described herein may include or use any appropriate voltage or current source, such as a battery, an alternator, a fuel cell, and the like, providing any appropriate current or voltage, such as about 12 volts, about 42 volts, and the like. As still yet another example, any of the vehicles described herein may include or use any desired system or engine. Those systems or engines may include items that use fossil fuels, such as gasoline, natural gas, propane, and the like, electricity, such as that generated by a battery, magneto, fuel cell, solar cell and the like, wind and hybrids or combinations thereof. As still yet another example, any vehicle described herein may include an electronic control unit (ECU), a data link connector (DLC), and a vehicle communication link that connects the DLC to the ECU.

Although many of the example embodiments are described with respect to a vehicle, the example embodiments can be applicable to products or repairable items other than a vehicle. As an example, the other products or repairable items can include home appliances, such as a refrigerator, a dishwasher, or a washing machine, or a consumer electronic device, such as a television, a cellular phone, or a tablet device. Other examples of the other products or repairable items are also possible. Accordingly, for embodiments based on these other products or repairable items, the term vehicle in the described embodiments can be replaced with a name of the other product or repairable item.

In this description, the articles "a" or "an" are used to introduce elements of the example embodiments. Any reference to "a" or "an" refers to "at least one," and any reference to "the" refers to "the at least one," unless otherwise specified, or unless the context clearly dictates otherwise. The intent of using those articles is that there is one or more of the elements. The intent of using the conjunction "or" within a described list of at least two terms is to indicate any of the listed terms or any combination of the listed terms. The use of ordinal numbers such as "first," "second," "third" and so on is to distinguish respective elements rather than to denote a particular order of those elements. For purpose of this description, the terms "multiple" and "a plurality of" refer to "two or more" or "more than one."

The block diagram(s) and flow chart(s) shown in the figures are provided merely as examples and are not intended to be limiting. Many of the elements illustrated in the figures or described herein are functional elements that can be implemented as discrete or distributed elements or in conjunction with other elements, and in any suitable combination and location. Those skilled in the art will appreciate that other arrangements and elements (e.g., machines, interfaces, functions, orders, or groupings of functions) can be used instead. Furthermore, various functions described as being performed by one or more elements or a machine described herein can be carried out by a processor executing computer-readable program instructions or by any combination of hardware, firmware, or software.

II. Example Architecture

FIG. 1 is a block diagram of a system 100 in accordance with one or more example embodiments. Various combinations of the elements shown in FIG. 1 can be arranged as other systems or as a sub-system to carry out example embodiments described herein. System 100 includes a vehicle repair data (VRD) system 102 and a network 104. Network 104 can include a wide area network (WAN), such as the Internet or a portion thereof. Additionally or alternatively, network 104 can include a wireless network, a wired network, a local area network (LAN), or some other type of network. Network 104 can include two or more of the aforementioned example networks.

System 100 includes a vehicle repair tool (VRT) 106, and VRT 108, 110, 112, 114, 116, 118, and 120. Each VRT or a combination of multiple VRT can include or be arranged as a machine. Any VRT described herein can be, but is not required to be, configured to generate or transmit an original repair order (RO) to VRD system 102. An RO generated by a VRT can be provided to an operator of VRD system 102 by a courier 122, such as the United States Postal Service or the Federal Express Corporation. The operator of VRD system 102 can enter an original RO into VRD system 102 using an RO manual entry device, such as an RO manual entry device 202 shown in FIG. 2. The manually-entered RO can be stored in a data storage device, such as a data storage device 210 shown in FIG. 2.

VRT 114, 116, 118, and 120 represent vehicle repair tools that are configured to perform at least one of the following functions: request a repair-hint (e.g., an auto-generated repair hint) stored at VRD system 102, receive a repair-hint transmitted from VRD system 102 using network 104 or otherwise provided or generated by VRD system 102, and present a repair-hint by a user interface. A repair-hint generated by VRD system 102 can be provided to an operator of a VRT, such as VRT 114, by courier 122. As an example, courier 122 can provide the repair-hint by providing the VRT operator with a computer-readable medium, such as a CD-ROM, including a repair-hint generated by VRD system 102. VRT 116, 118, and 120 can receive a repair-hint generated by VRD system 102 and transmitted to the VRT using wireless or wired communications and network 104.

A VRT can include a code reader, such as a one-dimensional bar code reader or a two-dimensional bar coder reader. The code reader can read and decode a code on a vehicle, such as a VIN bar code, a code on a replacement part, such as a bar code or quick-response code on packaging of a replacement part, or some other type of code. Data encoded from a code can be entered onto an original RO, such as original RO 400 shown in FIG. 4.

Figure 2:
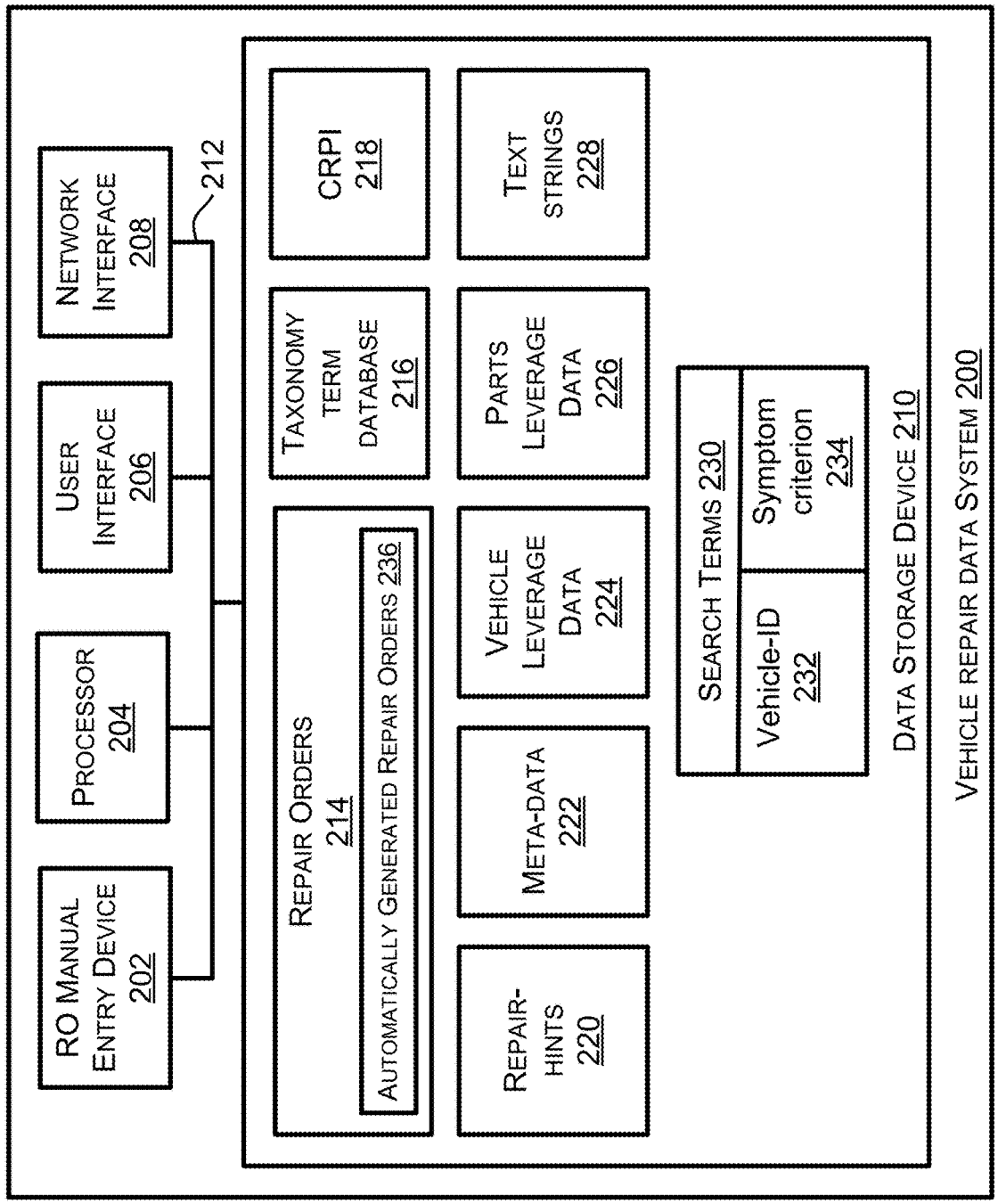
FIG. 2 is a block diagram of a vehicle repair data (VRD) system in accordance with one or more example embodiments.

Next, FIG. 2 is a block diagram showing details of a vehicle repair data (VRD) system 200. VRD system 102, shown in FIG. 1, can be configured similar to VRD system 200. VRD system 200 can be configured like VRD system 102 shown in FIG. 1. VRD system 200 can include or be arranged as a machine. VRD system 200 or one or more components thereof can be arranged or referred to as a computing system or a computer system. VRD system 200 can comprise, be configured as, or be referred to as a server system, a server device, or more simply, a server. In accordance with embodiments in which VRD system 200 operates as a server, VRD system 200 can serve one or more vehicle repair tools (VRT) operating as a client device to the server.

VRD system 200 includes the RO manual entry device 202, a processor 204, a user interface 206, a network interface 208, and a data storage device 210, all of which can be linked together via a system bus, network, or other connection mechanism 212.

RO manual entry device 202 can include one or more devices for inputting data shown on a printed RO into VRD system 200 for storage as an original RO within repair orders (RO) 214. As an example, RO manual entry device 202 can include a scanner device with or without an optical character recognition software application. As another example, RO manual entry device 202 can include a keyboard for keying in (e.g., typing) the data shown on the printed RO and sending the keyed in (e.g., typed or otherwise entered) data to processor 204 for storage as an original RO within RO 214. As yet another example, RO manual entry device 202 can include a device that accepts data storage devices, such as a CD-ROM including data representing an original RO generated by a VRT. As yet another example, RO manual entry device 202 can include a laptop or desktop computing device with or connected to a display.

An original RO can be displayed by RO manual entry device 202 or user interface 206. For any of a variety of reasons, such as security of information located on an original RO, VRD system 102 can be configured such that an original RO generated by a first VRT, such as VRT 106, is not provided to a second VRT, such as VRT 116. VRD system 102 can generate a presentable RO based, at least in part, on information on the original RO generated by the VRT 106, and provide the presentable RO to VRT 116.

A processor, such as processor 204, can include one or more general purpose processors (e.g., INTEL single core microprocessors or INTEL multicore microprocessors) or one or more special purpose processors (e.g., digital signal processors). A processor, such as processor 204, can be configured to execute computer-readable program instructions, such as computer-readable program instructions (CRPI) 218. For purposes of this description, processor 204 executing CRPI 218 to perform some function described herein can include executing a portion of CRPI 218 or the entirety of CRPI 218. Executing a portion or the entirety of CRPI 218 can include executing some of the computer-readable program instructions multiple times. Processor 204 can be programmed to perform any one or any combination of functions performed by execution of a program instruction of CRPI 218.

User interface 206 can include an interface to components operable to enter data or information into VRD system 200 or to components that can present data or information output by VRD system 200. Those components can be referred to as user interface components. User interface 206 can include one or more audio/visual ports or communication ports that connect to a user interface component by a wired or wireless user interface communication link.

User interface 206 can include one or more of the user interface components. As an example, the user interface components can include an infrared remote control device, a display device, a loud speaker configured to convert electrical signals to audible sounds, a keyboard, a touch screen, a pointing device, such as a computer mouse, or some other component for generating signals to enter data or information into VRD system 200 or to present data or information output by user interface 206.

User interface 206 can include a transmitter or transceiver to provide the data or information to another user interface component or to another element of VRD system 200. The data or information provided by user interface 206 can include, but is not limited to include, a repair-hint of repair-hints 220.

Network interface 208 can include an interface to one or more communication networks, such as network 104. For use with wireless communication networks, network interface 208 can include one or more antennas for transmitting or receiving wireless communications. Network interface 208 can include one or more communication ports configured to connect to a wired communication link of a network, such as a coaxial cable, an Ethernet cable, a fiber optic cable, a digital subscriber line (DSL), a telephone line of a public switched telephone network (PSTN) or some other wired connector. Network interface 208 can include a network controller including a transmitter, a receiver, or a transceiver. The transmitter or transceiver can provide data or information to a communication port for transmission as network communications over the connected network. The receiver or transceiver can receive data or information received at a communication port from the connected network.

A data storage device, such as such as data storage device 210 or any other data storage device discussed in this description or included within a device or system described in this description, may include a non-transitory computer-readable medium, a transitory computer-readable medium, or both a non-transitory computer-readable medium and a transitory computer-readable medium. In one respect, a non-transitory computer-readable medium may be integrated in whole or in part with a processor. In another respect, a non-transitory computer-readable medium, or a portion thereof, may be separate and distinct from a processor.

A non-transitory computer-readable medium may include, for example, a volatile or non-volatile storage component, such as an optical, magnetic, organic or other memory or disc storage. Additionally or alternatively, a non-transitory computer-readable medium may include, for example, a random-access memory (RAM), a read-only memory (ROM), a programmable read-only memory (PROM), an erasable programmable read-only memory (EPROM), an electrically erasable programmable read-only memory (EEPROM), a compact disk read-only memory (CD-ROM), or another memory device that is configured to provide data or CRPI to a processor.

A transitory computer-readable medium may include, for example, CRPI provided over a communication link, such as a communication link which is connected to or is part of the network 104. The communication link may include a digital or analog communication link. The communication link may include a wired communication link or a wireless communication link. A computer-readable medium may be referred to by other terms such as a "computer-readable storage medium," a "data storage device," a "memory device," a "memory," or a "computer-readable database." Any of those alternative terms may be preceded with the prefix "transitory" or "non-transitory."

Data storage device 210 can store a variety of data. The data stored by data storage device 210 can be data that was provided to data storage device 210 for storage from RO manual entry device 202, processor 204, user interface 206 or network interface 208. As shown in FIG. 2, data storage device 210 can store repair orders (RO) 214, a taxonomy term database 216, computer-readable program instructions (CRPI) 218, repair hints 220, meta-data 222, vehicle leverage data 224, parts leverage data 226, text strings 228, and search terms 230. Search terms 230 can include, but is not limited to, vehicle-identification (i.e., vehicle-ID) search terms 232, such as year/make/model/engine (Y/M/M/E) attributes, and symptom criterion 234.

RO 214 can include computer-readable RO. The computer-readable RO can be arranged as a structured query language (SQL) file, an extensible markup language (XML) file, or some other type of computer-readable file or data structure. The RO within RO 214 can be received from RO manual entry device 202, from network interface 208 by way of network 104, or from another device. The RO within RO 214 can be an original RO, such as RO generated by a VRT shown in FIG. 1 or entered using RO manual entry device 202, or a presentable RO generated by VRD system 200.

FIG. 4 shows an example original RO 400. Original RO 400 can be generated by a VRT, such as any VRT shown in FIG. 1. Original RO 400 can include a computer-readable-data RO (or more simply, computer-readable RO) transmitted over network 104. Original RO 400 can include a paper-copy RO, such as carbonless multi-sheet RO or some other type of paper-copy RO. Original RO 400 can include both a computer-readable-data version and a paper-copy version. A paper-copy RO can be generated without using a VRT. A computer-readable RO generated from a paper-copy RO can be an original RO.

Original RO 400 includes a service provider identifier 402, a date of service identifier 404, a customer indicator 406 that indicates a customer seeking service of a given vehicle, vehicle information 408 that indicates the given vehicle, vehicle service requests 410, 412, and 414 indicating the complaint(s) or service(s) requested by the customer, parts information 416 indicating parts obtained for servicing the given vehicle, service procedure information 418, 420, and 422 carried out on the given vehicle, and a vehicle-usage indicator 430 (e.g., vehicle mileage data that indicates a number of miles the given vehicle has been driven). The vehicle-usage indicator 430 on original RO 400 can indicate a driven distance using kilometers or some other units as an alternative or in addition to vehicle mileage data. In addition to or as an alternative to indicating a distance, the vehicle-usage indicator 430 can include a time-used indicator such as an hours indicator indicating, for example, how long a vehicle or an engine has been used.

Service provider identifier 402 can include information that indicates a name and geographic location of the service provider. Vehicle information 408 can include a vehicle identification number (VIN) 432 associated with the given vehicle and a description of the given vehicle. Service procedure information 418, 420, and 422 can include information within distinct RO sections 424, 426, and 428, respectively, of original RO 400. The service procedure information within any one distinct RO section 424, 426, and 428 can be unrelated to the service procedure information with any other distinct section. Alternatively, two or more distinct sections including service procedure information can pertain to related service operations performed on the given vehicle.

Original RO 400 includes labor operation codes (LOCs). The LOCs can conform to those defined by a vehicle manufacturer, a service provider that generates an RO, a service information provider, such as Mitchell Repair Information, LLC, Poway, Calif., or some other entity. For simplicity of FIG. 4, the LOCs are shown within parenthesis, such as (C45) and (C117, C245). Distinct LOC within parenthesis are separate by a comma. Each labor operation code (LOC) can refer to a particular operation performed to the given vehicle. Processor 204, executing CRPI 218, can use a LOC to determine what type of service or repair operation was performed to the given vehicle. Using the LOC in that manner is helpful if other information regarding that operation is incomplete or described using non-standard phrases or terms. Processor 204 can also use LOC to determine context for the service procedure information on or within the RO.

Multiple portions of text on an RO, such as original RO 400, can be grouped as phrases. When comparing contents of an RO to various terms of taxonomy term database 216, such as mapping terms, standard terms, or context terms, words within a given proximity to one or more other words on original RO 400 can be grouped as a phrase to be compared to the mapping, standard, or context terms. The given proximity can be within X words, where X equals 1, 2, 3, 4, 5, or some other number of words. As an example, service procedure information 418 states "Check starter/ignition system." The words "Check" and "ignition system" are within 3 words of one another. In accordance with an embodiment in which the given proximity is 4 word, the words "Check" and "ignition system" can be grouped as the phrase "Check ignition system" for comparison to mapping, standard, context terms, or labor operation codes.

The mapping, standard, context terms, or labor operation codes can be stored as part of taxonomy term database 216. Taxonomy term database 216 can include data that identifies words or phrases that are associated with one another. The association can be based on the words or phrases having a common meaning. The words or phrases identified as being associated with one another can be referred to a "taxonomy database group" or, more simply, a "taxonomy group."

Taxonomy term database 216 can include one or more taxonomy groups, and each taxonomy group can include one or more taxonomy terms (e.g., words or phrases). As an example, taxonomy term database 216 can include data that identifies the following phrases as a taxonomy group: (i) stalls when cold, (i) engine quits when temperature is low, (iii) engine dies in the morning, (iv) dies in the morning, (v) dies in the AM, and (vi) engine stalls on cold mornings.

Each taxonomy group can be associated with a standard term, which could be a first word or first phrase added to the taxonomy group. Alternatively, a word or phrase subsequently added to the taxonomy group can be the standard term for the taxonomy group. The words or phrases other than the standard term within a taxonomy group can be mapping terms. The words or phrases within each taxonomy group can be obtained from an RO. An administrator can approve adding or modifying any taxonomy group by, for example, processor 204 executing CRPI 218. Terms within taxonomy term database 216 can be compared to terms on a computer-readable RO. A mapping term on an original RO and found within a given taxonomy group can be represented on a presentable RO by a standard term for the given taxonomy group.

RO 214 can include original RO 400 as a computer-readable version of original RO 400. RO 214 can include one or more other computer-readable RO arranged like original RO 400 and one or more other computer-readable RO arranged in an RO configuration that differs from original RO 400. The other RO configurations typically include at least one of the types of information described above as being a part of original RO 400.

An RO stored within RO 214, such as original RO 400 or another RO, can include searchable text or symbols (e.g., text, symbols, or text and symbols). As an example, a symbol on an RO can include an empty check box or a checkbox and a checkmark inside the checkbox. Original RO 400 can be modified to include a presentable RO 500 (shown in FIG. 5) that represents original RO 400 or data thereon. Additionally or alternatively, presentable RO 500 can be distinct and separate from original RO 400.

Processor 204 can search the text, symbols or other content on an RO of RO 214 or the meta-data associated with an RO to associate an RO within a cluster of RO (or more simply, an RO cluster). Each cluster of RO can be associated with defined RO attributes, such as a diagnostic trouble code (DTC), action, or component listed on the RO. Other attributes of the information recorded on an RO can be associated with an RO cluster. Table 1 shows data identifying twenty-five clusters identified with ID 1 through 25, inclusive. The cluster size indicates how many RO have been associated with the respective cluster. The cluster size can be modified as or after additional RO are added to RO 214 or after an RO is transferred from one cluster to a different cluster. Table 1 shows examples of DTC, Action, and component attributes associated with each respective RO cluster.

TABLE 1

| Cluster ID | Cluster Size | DTC | Action | Component(s) |
|---|---|---|---|---|
| 1 | 3,101 | P0303 | Replaced | Ignition Coil |
| 2 | 3,086 | P0303 | Replaced | Spark Plug |
| 3 | 2,982 | P0302 | Replaced | Ignition Coil |
| 4 | 2,957 | P0304 | Replaced | Spark Plug |
| 5 | 2,831 | P0171 | Replaced | Oxygen Sensor |
| 6 | 2,813 | P0325 | Replaced | Knock Sensor |
| 7 | 2,762 | P0301 | Replaced | Spark Plug |
| 8 | 2,713 | P0320 | Replaced | Crankshaft Position Sensor |
| 9 | 2,624 | P0404 | Replaced | Exhaust Gas Recirculation Valve |
| 10 | 2,609 | P0302 | Replaced | Spark Plug |
| 11 | 2,603 | P0303 | Replaced | Spark Plug Wire, Spark Plug |
| 12 | 2,328 | P0161 | Replaced | Oxygen Sensor |
| 13 | 2,324 | C1500 | Replaced | Fuel Filter, Fuel Tank Module |
| 14 | 2,232 | P0301 | Replaced | Spark Plug Wire, Spark Plug |
| 15 | 2,225 | P0302 | Replaced | Spark Plug Wire, Spark Plug |
| 16 | 2,107 | P0300 | Replaced | Ignition Coil |
| 17 | 2,104 | P0305 | Replaced | Ignition Coil |
| 18 | 2,088 | P0171, P0174 | Replaced | Mass Airflow Sensor |
| 19 | 2,007 | P0134 | Replaced | Oxygen Sensor |
| 20 | 1,991 | P0304 | Replaced | Spark Plug Wire, Spark Plug |
| 21 | 1,963 | P0171, P0174 | Replaced | Fuel Filter |
| 22 | 1,952 | P0306 | Replaced | Ignition Coil |
| 23 | 1,899 | P0128 | Replaced | Thermostat Housing, Engine Coolant Thermostat |
| 24 | 1,824 | P0125 | Replaced | Engine Coolant Thermostat |
| 25 | 1,783 | P0031 | Replaced | Oxygen Sensor |

Table 1 can be modified to include a separate column for other attributes as well. The other attributes can identify RO attributes such as, but not limited to, a customer complaint, a date, or a labor operation code (LOC). As an example, the customer complaint can include, but is not limited to, terms such as rattles, won't start, and vibrates. Auto-generated repair-hints for those example customer complaint terms can include repair hints identifying a way to stop a vehicle from rattling, a way to fix a vehicle that does not start, and a way to stop a vehicle from vibrating, respectively.

Table 2 below shows an example of data included on 25 of the 2,088 RO associated with the RO cluster ID 18 shown in Table 1. The RO data in Table 2 includes an RO identifier that can, for example, be assigned by a VRT or VRD system 102. The RO data in Table 2 also includes year/make/model/engine attributes associated with each RO.

TABLE 2

| RO ID | Year | Make | Model | Engine |
|---|---|---|---|---|
| 2197 | 1999 | Cadillac | Catera | 3.0 L V6, VIN (R) |
| 9277 | 1998 | Mercury | Grand Marquis GS | 4.6 L V8, VIN (W) |
| 1156 | 2002 | Ford | Pickup F150 | 4.2 L, V6 VIN (2) |
| 6978 | 2003 | Ford | Taurus SE | 3.0 L V6, VIN (U) |
| 7923 | 1999 | Ford | Pickup F150 | 4.6 L V8, VIN (W) |
| 5074 | 2000 | Infiniti | I30 | 3.0 L V6, VIN (C) |
| 5640 | 1997 | Ford | Cutaway E350 | 6.8 L, V10, VIN (S) |
| 1037 | 2002 | Land Rover | Range Rover HSE | 4.6 L, V8, VIN (4) |
| 1509 | 2002 | Ford | Explorer | 4.0 L, V6-245, SOHC |
| 1673 | 2006 | Ford | Explorer | 4.0 L, V6-245, SOHC |
| 2088 | 1998 | Ford | Cutaway E350 | 6.8 L, V10, VIN (S) |
| 4692 | 2006 | Ford | Pickup F250 Super Duty | 5.4 L, V8 VIN (5) |
| 5183 | 1996 | Mercury | Grand Marquis GS | 4.6 L, V8, VIN (W) MFI |
| 6825 | 2000 | Saturn | LS2 | 3.0 L, V6, VIN (R) |
| 8203 | 2001 | Hyundai | XG300 | 3.0 L V6, VIN (D) |
| 3915 | 1997 | Ford | Crown Victoria LX | 4.6 L, V8, VIN (W) |
| 7481 | 2001 | Nissan | Pathfinder SE | 3.5 L, V6-3498, DOHC |
| 7833 | 2007 | Chevrolet | Silverado Classic | 6.0 L, V8, VIN (U) |
| 7976 | 1997 | Ford | Thunderbird LX | 4.6 L, V8, VIN (W) |
| 9892 | 2000 | Nissan | Maxima GLE | 3.0 L V6, VIN (C) |
| 0156 | 1999 | Ford | Econoline E150 | 4.6 L, V8, VIN (6) |
| 1194 | 2002 | Ford | Pickup F150 | 4.2 L V6, VIN (2) |

TABLE 2-continued

| RO ID | Year | Make | Model | Engine |
|---|---|---|---|---|
| 8797 | 2006 | Ford | Crown Victoria LX | 4.6 L V8, VIN (W) |
| 6321 | 2000 | Ford | Explorer | 4.0 L V6, VIN (X) |
| 6924 | 1998 | Ford | Ranger | 4.0 L V6, VIN (X) |

Some vehicle models are associated with a sub-model attribute. Some vehicle models are not associated with a sub-model attribute. Table 2 can be modified to include a separate column to include sub-model attributes for vehicles that are associated with a sub-model attribute. As an example, RO ID 7923 pertains to a Ford Pickup F150 make and model. The term "F150" can be referred to as a sub-model attribute. Other sub-model attributes for Ford Pickup models can include the "F250" and "F350" sub-model attributes. A sub-model attribute can be included on an RO. Searching for RO or repair-hints based on a sub-model in addition to Y/M/M/E attributes can lead to search results having RO or repair-hints associated with a particular sub-model, but not the other sub-model(s) of a particular vehicle having particular Y/M/M/E attributes. The "S" within Y/M/M/S/E can represent a sub-model attribute.

Table 2 can be modified to include a separate column for other attributes as well. The other attributes can identify system (Sys) attributes such as, but not limited to, a transmission attribute, a suspension attribute, and an audio system attribute. A set of attributes including a system attribute can be referred to as Y/M/M/E/Sys attributes.

Vehicle leverage data 224 can include computer-readable data that identifies different vehicle models built on a common vehicle platform. Vehicles built on a common vehicle platform can have many similarities including the use of common parts or part numbers. Vehicles built on a common platform can experience similar vehicle symptoms that arise for similar reasons, such as failure of a part common to vehicles built on the common vehicle platform. Table 3 shows an example of data that can be stored as vehicle leverage data 224.

Processor 204 can generate an RO cluster that covers multiple vehicle models, such as the three vehicle models of VLD-3 shown in Table 3. If RO 214 includes 100 RO for the Chevrolet Lumina APV model between 1990-1996 and a given repair condition, 150 RO for the Pontiac Tran Sport models between 1990-1996 and the given problem, and 40 RO for the Oldsmobile Silhouette model between 1990-1196 and the given problem, processor 204 can generate three separate RO clusters for the 290 RO or a single RO cluster for the 290 RO. A greater quantity of RO can indicate a greater likelihood of a successful repair of the given problem.

TABLE 3

| Vehicle Leverage Data Identifier (VLD ID) | Vehicle Models | Model Year(s) | Exceptions |
|---|---|---|---|
| VLD-1 | Cadillac Escalade, Chevrolet Tahoe, Chevrolet Suburban, GMC Yukon | 2011-2013 | GMC Yukon uses hi-capacity radiator |
| VLD-2 | Chevrolet Lumina APV, Pontiac Trans Sport, Oldsmobile Silhouette | 1990-1996 | N.A. |
| VLD-3 | Buick Regal, Oldsmobile Intrigue | 1998-2002 | N.A. |
| VLD-4 | Ford Expedition, Lincoln Navigator | 2008-2014 | Lincoln Navigator uses aluminum cylinder heads |

Processor 204 can use the exception data within vehicle leverage data 224 to exclude RO pertaining to certain vehicle models from an RO cluster associated with a group of vehicles built on a common platform. For the exception data in Table 3, since the GMC Yukon uses a different radiator than the Cadillac Escalade, the Chevrolet Tahoe, and the Chevrolet Suburban, an RO cluster pertaining to a radiator for a GMC Yukon may not be grouped with an RO cluster pertaining to a radiator on Cadillac Escalades, Chevrolet Tahoes, and Chevrolet Suburbans.

Parts leverage data 226 can include data that identifies different vehicle models that use a common part produced by one or more part(s) manufacturer. For purposes of this description, a common part is a part that can be used in either of two or more vehicle models without altering the part or any of the two or more vehicles to use the common part. Various references to a common part, such as a part number or part name, used by any or all of the part(s) manufacturer and the manufacturer(s) of the different vehicle models can be used. Vehicle models using a common part can experience similar vehicle symptoms that arise for similar reasons, such as failure of the common part. Table 4 shows an example of data that can be stored as parts leverage data 226.

TABLE 4

| Common Vehicle Part Identifier | Common Vehicle Part | Vehicle Models | Model Year(s) | Part(s) manufacturer |
|---|---|---|---|---|
| PLD-1 | Coolant temperature sensor | Cadillac Escalade | 2012 | Delco Parts, Inc. |
| PLD-1 | Coolant temperature sensor | Chevrolet Tahoe | 2012 | Delco Parts, Inc. |
| PLD-1 | Coolant temperature sensor | Chevrolet Suburban | 2012 | Delco Parts, Inc. |
| PLD-2 | Fuel injector(s) | Honda Accord | 2013 | ACME, Inc. |
| PLD-2 | Fuel injector(s) | Honda Civic | 2013 | ACME, Inc. |

Processor 204 can generate an RO cluster that covers a common vehicle part and multiple vehicle models, such as the coolant temperature sensor and three vehicle models of PLD-1 shown in Table 4. If RO 214 includes 30 RO for the 2012 Cadillac Escalade model and the coolant temperature sensor, 40 RO for the 2012 Chevrolet Tahoe model and the coolant temperature sensor, and 20 RO for the 2012 Chevrolet Suburban model and the coolant temperature sensor, processor 204 can generate three separate RO clusters for the 70 RO or a single RO cluster for the 70 RO. A greater quantity of RO can indicate a greater likelihood of occurrence of a successful repair of a given problem arising from the coolant temperature sensor.

CRPI 218 can include program instructions executable by processor 204 to carry out functions described herein or performable by VRD system 200. CRPI 218 can include program instructions that are executable to parse data from an original RO stored within RO 214 and to identify the service procedure information, vehicle identification, and parts usage information from the original RO for use in generating a presentable RO or to increment a count of a cluster size if a presentable RO pertaining to the original RO has already been generated, or to decrement a cluster size if processor 204 transfers an RO from one cluster to a different cluster.

CRPI 218 can include program instructions executable by processor 204 to generate, for each auto-generated repair-hint and based on the RO stored in RO 214, meta-data associated with at least one set of search terms. Meta-data 222 can include meta-data generated by processor 204 based the information listed on original RO 400 including, but not limited to the LOC and a definition of the LOC.

CRPI 218 can include program instructions executable by processor 204 to determine that words or phrases within service procedure information, such as service procedure information 418, 420, or 422, are within one or more taxonomy groups of taxonomy term database 216, and to associate (e.g., relate) that service procedure information with the one or more taxonomy groups. The service procedure information associated with any given taxonomy group can be part of a new RO cluster or additional service procedure information to be added to an RO cluster or to modify an RO cluster.

CRPI 218 can include program instructions executable by processor 204 to perform any one or more of the operations, functions, or actions illustrated in blocks 602-610 in FIG. 6 as described below in this description.

Text strings 228 can include strings of text (e.g., two or more words, numbers or symbols). A text string can include one or more gaps for inserting meta-data to complete the text string. A text string can include a complete text string without any gaps. Processor 204 can select one or more text strings to associate with a set of terms (e.g., search terms) that can be entered or received to search for a repair hint of repair hints 220. Processor 204 can select the meta-data to insert into the gap(s) of a text string. Text strings 228 can include text strings entered by user interface 206. Text strings 228 can include text strings received by network interface 208.

Search terms 230 can include various sets of search terms. A set of search terms can include vehicle-ID search terms 232 or a symptom criterion 234. A first example set of search terms can include search terms received by network interface 208 as part of a request for a repair hint. The first example set of search terms can include search terms that are non-standard terms in taxonomy terms database 216 and can be referred to as non-standard search terms (NSST). Processor 204 can identify, within taxonomy term database 216, standard terms that match the search terms received by network interface 208 and then use any standard terms included within the received search terms or identified from taxonomy term database 216 to search for a repair hint. The non-standard search terms stored as part of search terms 230 can subsequently be reviewed by processor 204 or a human using RO manual entry device 202 or user interface 206 for inclusion as part of taxonomy term database 216.

A second example set of search terms can include standard sets of search terms and can be referred to as standard search terms (SST). A standard set of search terms can include standard vehicle-ID search terms, such as Y/M/M/E attributes, defined in taxonomy term database 216 and standard symptom criterion defined in taxonomy term database 216. Processor 204 can associate one or more standard sets of search terms with a repair hint or a repair order. A set of search terms associated with a repair hint or repair order can be stored as meta-data associated with that repair hint or repair order. Taxonomy term database 216 can include search terms 230. The second example set of search terms 230 can be associated with one more sets of search terms like the first example set of search terms.

Table 5 shows an example of search terms that can be stored in search terms 230. NSST-227 is associated with SST-15. SST-15 is associated with RO ID 3915. Repair hint 510 on RO ID 3915 can be identified in response to receiving NSST-227, determining that SST-15 is associated with NSST-227, and determining RO ID 3915 is associated with SST-15. SST-1456 is a set of standard search terms having symptom criterion common to SST-15 and SST-1456, and a Y/M/M/E attribute that differs from the Y/M/M/E for SST-15 only by the model years (i.e., 2000 instead of 1999). SST-15 and SST-1456 are both associated with RO ID 3915. This association can be determined based on vehicle leverage data 224 or parts leverage data 226.

TABLE 5

| Search Terms | Y/M/M/E | Symptom Criterion | Associations |
|---|---|---|---|
| NSST-227 | 97 Ford Crown Vic. 8 cyl. | Emissions and MAF failed. DTC P171 P174. | SST-15 |
| SST-15 | 1999/Ford/Crown Victoria/4.6 L V8 (W) | Pcode: P0171, P0174 Component: MAF sensor Work Requested: failed state emissions certification | RO ID 3915 NSST-227 |
| SST-1456 | 2000/Ford/Crown Victoria/4.6 L V8 (W) | Pcode: P0171, P0174 Component: MAF sensor Work Requested: failed state emissions certification | RO ID 3915 |

The vehicle-ID search terms 232 is one example of search terms that can be included within search terms 230. Vehicle- ID search terms 232 can include various selectable attributes. For example, the attributes of vehicle-ID search terms 232 can include Y/M/M/E attributes. As another example, the attributes of vehicle-ID search terms 232 can include Year/Make/Model/Sub-model/Engine (Y/M/M/S/E) attributes as discussed with respect to Table 2. As another example, the attributes of vehicle-ID search terms 232 can include Year/Make/Model/Engine/System (Y/M/M/E/Sys) attributes. As another example, the attributes of vehicle-ID search terms 232 can include Year/Make/Model/Sub-model/Engine/System (Y/M/M/S/E/Sys) attributes.

The system (Sys) attribute vehicle-ID search terms 232 can indicate or represent a system (e.g., one or more systems) or a component (e.g., one or more components) within a vehicle. As an example, the system or component within the vehicle can identify (i) a powertrain transmission within the vehicle (e.g., a 4-speed automatic transmission with over-drive), (ii) a rear differential within the vehicle (e.g., a rear differential with a 4.11:1 gear ratio), (iii) an electric alternator within the vehicle (e.g., a 100 ampere alternator), (iv) a heater, ventilation, and air-conditioning (HVAC) system installed within the vehicle (e.g., a dual-zone (e.g., a driver side and passenger side) HVAC system), or some other system or component installed within, attached to, or other otherwise operating on or in the vehicle.

The order of any of the vehicle-ID search terms 232 described herein can be rearranged as desired. For example, the order of the Y/M/M/E attributes could be rearranged as Make/Model/Engine/Year (M/M/E/Y) attributes or in another arrangement.

FIG. 5 shows an example content of a presentable RO 500 including an RO identifier 502, RO timing information 504, RO vehicle identifier 506, a vehicle service request 508, an auto-generated repair-hint 510, meta-data 512, and a usage indicator 514. Presentable RO 500 is based on service procedure information 418 an original RO 400. RO identifier 502 is "3915," which is also shown in the seventeenth row of Table 2. RO timing information 504 includes a year designator (i.e., 2009) to indicate a time that pertains to RO ID 3915. That time can indicate, for example, when original RO 400 was written, completed, or submitted to VRD system 102. RO timing information could include other or different time information such as a day, month, or hour-of-a-day. RO vehicle identifier 506 includes the year/make/model/engine attributes shown in the seventeenth row of Table 2 for RO ID 3915. Additional or other attributes of the given vehicle identified on original RO 400 can be included on presentable RO 500.

Presentable RO 500 includes elements in or based on original RO 400. Presentable RO 500 can be stored within data storage device 210 with or as part of original RO 400. Additionally or alternatively, presentable RO 500 can be stored separately and distinctly from original RO 400.

Vehicle service request 508 includes information pertaining to a vehicle service request on an RO within RO 214. Vehicle service request 508 can include one or more text strings from text strings 228. As an example, each sentence within vehicle service request 508 can be a separate text string. For example, a text string can include the text "Customer states the vehicle has [insert customer complaint]." The text within the square brackets (i.e., [ ]) identifies meta-data or a taxonomy term to be inserted to complete the text string. The portion of a text string within the square brackets can be referred to as a "text string gap" or more simply, "a gap." Processor 204 can select the meta-data or the taxonomy term based on information included on an original RO pertaining to RO ID 3915 received at VRD system 102. The text string "Please diagnose and advise" is an example of a text string without any gaps in which text is to be inserted to complete the text string. The term "MAF sensor" in the text string "Customer states please replace the MAF sensor" can be selected by processor to insert into the text string from meta-data 512.

Auto-generated repair-hint 510 can include one or more text strings from text strings 228. As an example, each sentence within auto-generated repair-hint 510 can be a separate text string. For example, a text string can include the text "Technician scan tested and verified the DTC [insert first Pcode] and DTC [insert second Pcode]." Processor 204 can select the DTC (e.g., Pcode) identifiers "P0171" and "P0174" from meta-data 512 to complete the text string by inserting those DTC (e.g., Pcode) identifiers into the text string gaps. Processor 204 can select the meta-data based on information, such as a LOC, included on an original RO pertaining to RO ID 3915 received at VRD system 102.

As another example, a text string can include multiple sentences within auto-generated repair-hint 510, such as all of the sentences, but the first sentence, within auto-generated repair-hint 510. Processor 204 can select fuel pump pressure readings (e.g., 30 and 40) to insert within the second sentence of that text string, and to select a component name (e.g., MAF sensor) from meta-data 512 or taxonomy term database 216 to insert in the $4^{th}$ through $9^{th}$ sentences of the multiple-sentence text string. Those inserted terms are underlined within FIG. 5.

Meta-data 512 can be stored with presentable RO 500 within RO 214. Additionally or alternatively, meta-data 512 can be stored within meta-data 222 along with a tag or reference to presentable RO 500.

Usage indicator 514 indicates a distance in miles associated with RO 500. Usage indicator 514 can be used by processor 204 to determine whether to select auto-generated repair-hint 510 when searching for a repair-hint based on a set of search terms.

Figure 3:
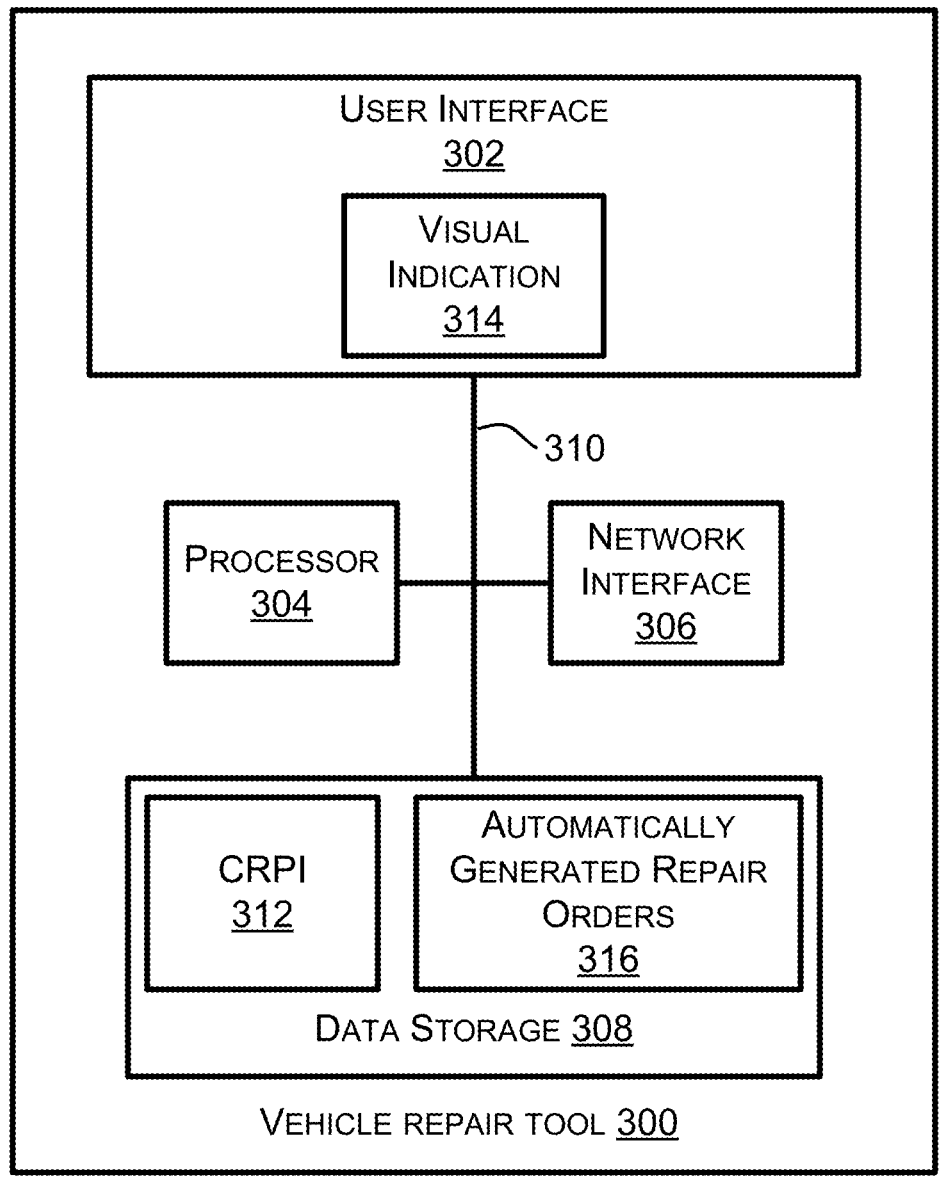
FIG. 3 is a block diagram showing a vehicle repair tool in accordance with one or more example embodiments.

Next, FIG. 3 is a block diagram showing details of example a vehicle repair tool (VRT) 300. VRT 300 can include or be arranged as a machine. Thus, VRT 300 or one or more components thereof can be arranged or referred to as a computing system or a computer system. VRT 300 includes a user interface 302, a processor 304, a network interface 306, and a data storage device 308, all of which can be linked together via a system bus, network, or other connection mechanism 310. One or more of the VRT shown in FIG. 1 can be arranged like VRT 300. VRT 300 can be used within system 100 like any of the VRT shown in FIG. 1.

Processor 304 can be configured to execute computer-readable program instructions, such as computer-readable program instructions (CRPI) 312 stored within data storage device 308. For purposes of this description, processor 304 executing CRPI 312 to perform some function described herein can include executing a portion of CRPI 312 or the entirety of CRPI 312. Executing a portion or the entirety of CRPI 312 can include executing some of the computer-readable program instructions multiple times.

Data storage device 308 can include a non-transitory computer-readable storage medium (i.e., two or more computer-readable storage mediums) readable by processor 304. The or each non-transitory computer-readable storage medium can include volatile or non-volatile storage components, such as optical, magnetic, organic or other memory or disc storage, which can be integrated in whole or in part with a processor 304.

User interface 302 can include an interface to components that are configured to enter data or information into VRT 300 or to components that are configured to present data or information output by VRT 300. Any of those components can be referred to as a VRT user interface component. User interface 302 can include one or more audio/visual ports or communication ports that connect to a VRT user interface component by a wired or wireless user interface communication link. Data or information entered into VRT 300 by user interface 302 can include data or information for preparing an RO, such as original RO 400.

User interface 302 can include one or more of the VRT user interface components. As an example, the VRT user interface components can include an infrared remote control device, a display device, a loud speaker configured to convert electrical signals to audible sounds, a keyboard, a touch screen, a pointing device, such as a computer mouse, or some other component for generating signals to enter data or information into VRT 300 or to present data or information output by user interface 302. User interface 302 can include a transmitter or transceiver to provide the data or information to another VRT user interface component.

Network interface 306 can include an interface to one or more communication networks, such as network 104. For use with wireless communication networks, network interface 306 can include one or more antennas for transmitting or receiving wireless communications. Network interface 306 can include one or more communication ports configured to connect to a wired communication link of a network. Examples of the wired communication link are listed elsewhere herein. Network interface 306 can include a network controller including a transmitter, a receiver, or a transceiver. The transmitter or transceiver can provide data or information to a communication port for transmission as network communications over the connected network. The receiver or transceiver can receive data or information received at a communication port from the connected network. The data or information provided by network interface 306 to the network can include an RO.

CRPI 312 can include program instructions for generating an RO, such as original RO 400, based on data input by user interface 302 or a user interface component thereof. CRPI 312 can include program instructions for performing diagnostic functions for diagnosing a vehicle identified on an RO. As an example, performing the diagnostic functions can include checking a diagnostic trouble code (DTC), such as a DTC 117, as identified in section 428 of original RO 400. CRPI 312 can include program instructions for (i) displaying, by user interface 302, vehicle-ID attributes selectable to form a set of search terms, symptom criterion selectable to form part of the set of search terms, and a field for entering a usage indicator. (ii) receiving a selection of the set of search terms, (iii) providing the selected set of search terms to network interface 306 for transmission of the selected search terms to VRD system 102, (iv) receiving, by network interface 306, a repair hint, such as an auto-generated repair-hint, from VRD system 102, and (v) displaying the received repair hint using user interface 302.

A VRT, such as VRT 300 or any of the VRT shown in FIG. 1, can include, or be configured as, a smartphone, a tablet device, a laptop computer, a desktop computer, or an embedded computing device, such as the VERDICT™ Diagnostic and Information System and the VERSUS® PRO Integrated Diagnostic and Information System, both of which are available from Snap-on Incorporated, Kenosha, Wis. Accordingly, a VRT can also include computer-readable program instructions to perform features such as, but not limited to, guided component tests, an online expert forum, electrical measurements, waveform capture, displaying vehicle records, etc.

III. Automatically Generating ROs

Figure 6:
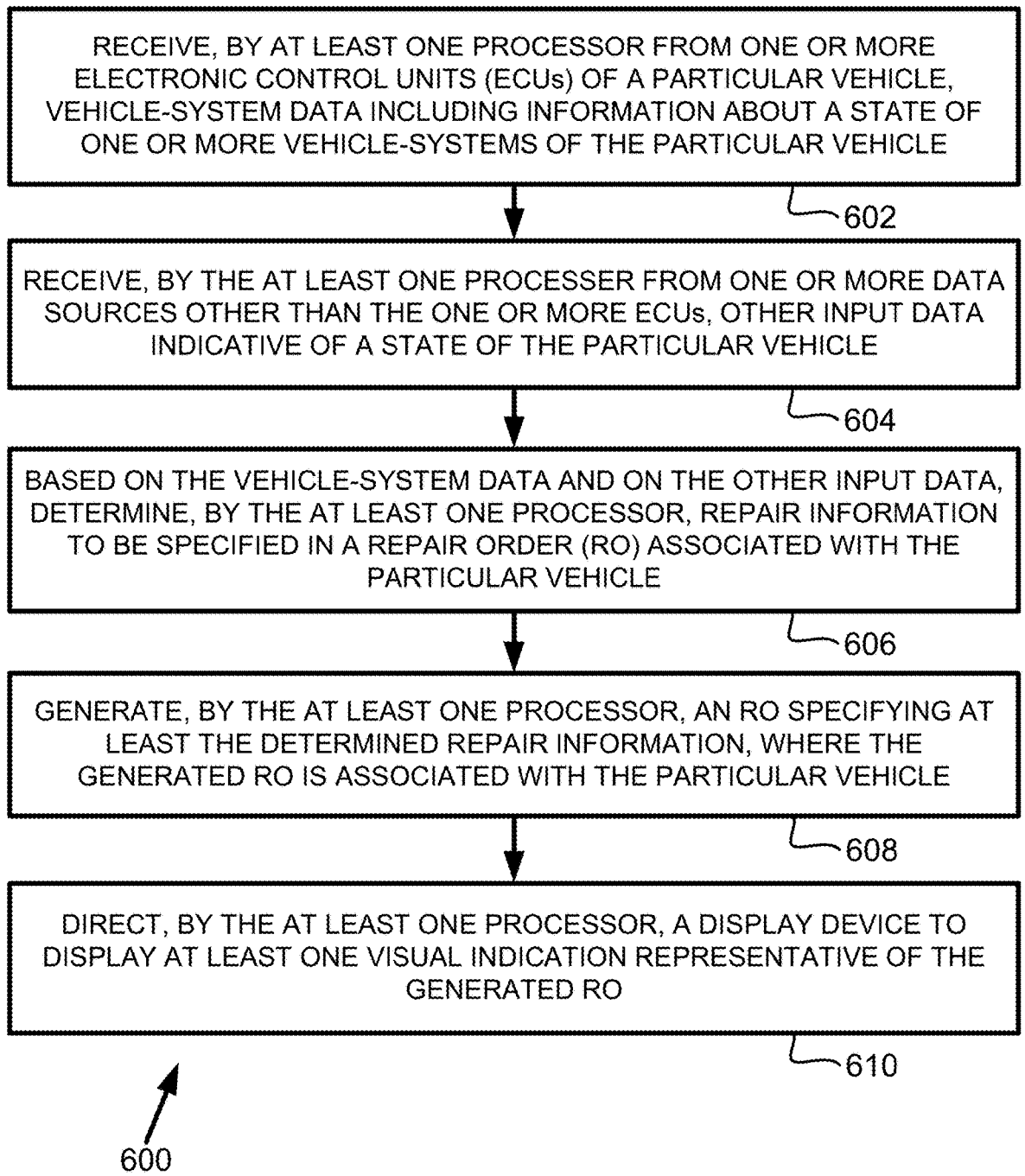
FIG. 6 is a flowchart depicting a set of functions that can be carried out in accordance with one or more example embodiments.

FIG. 6 is a flowchart illustrating a method 600, according to an example implementation. Method 600 shown in FIG. 6 (and other processes and methods disclosed herein) presents a method that can be implemented within an arrangement involving, for example, system 100, VRD system 200, and/or VRT 300 (or more particularly by one or more components or subsystems thereof, such as by a processor and a (e.g., non-transitory or transitory) computer-readable medium having instructions that are executable to cause the device to perform functions described herein). Additionally or alternatively, method 600 may be implemented within any other arrangements and systems.

Method 600 and other processes and methods disclosed herein may include one or more operations, functions, or actions as illustrated by one or more of blocks 602-610. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 600 and other processes and methods disclosed herein, the flowchart shows functionality and operation of one possible implementation of present implementations. In this regard, each block may represent a module, a segment, or a portion of program code, which includes one or more instructions executable by a processor for implementing specific logical functions or steps in the process. The program code may be stored on any type of computer-readable medium, for example, such as a storage device including a disk or hard drive. The computer readable medium may include non-transitory computer-readable medium, for example, such as computer-readable media that stores data for short periods of time like register memory, processor cache and Random Access Memory (RAM). The computer-readable medium may also include non-transitory media, such as secondary or persistent long term storage, like read only memory (ROM), optical or magnetic disks, compact-disc read only memory (CD-ROM), for example. The computer-readable media may also be any other volatile or non-volatile storage systems. The computer-readable medium may be considered a computer readable storage medium, for example, or a tangible storage device. In addition, for the method 600 and other processes and methods disclosed herein, each block in FIG. 6 may represent circuitry that is wired to perform the specific logical functions in the process.

At block 602, method 600 involves receiving, by at least one processor from one or more electronic control units (ECUs) of a particular vehicle, vehicle-system data including information about a state of one or more vehicle-systems of the particular vehicle.

In some cases, a particular vehicle may be distinguished from other vehicles based on one or more vehicle attributes. These vehicle attributes may include, but are not limited to: (i) a vehicle year attribute, (ii) a vehicle make attribute, (iii) a vehicle model attribute, (iv) a vehicle engine attribute, (v) a vehicle system attribute, (vi) a vehicle-year-make-model attribute, (vii) a vehicle-year-make-model-submodel attribute, (viii) a vehicle engine code, (ix) a vehicle drive type, and (x) a vehicle fuel system type. Other vehicle attributes are also possible.

Although various vehicles could be distinguished from one another based on such attributes, many vehicles could still include the same or similar types of components and/or features. For instance, various types of vehicles may each respectively include one or more ECUs. In practice, an ECU may be an embedded system that is configured to control and/or monitor one or more systems and/or sub-systems of a vehicle (hereinafter vehicle-systems). By way of example, an ECU could be an Engine Control Module (ECM), a Powertrain Control Module (PCM), a Transmission Control Module (TCM), a Brake Control Module (BCM), a Central Control Module (CCM), a Central Timing Module (CTM), a General Electronic Module (GEM), a Body Control Module (BCM), or a Suspension Control Module (SCM). Other examples are also possible.

Specifically, the ECU may control a particular vehicle-system based on various factors. For instance, the ECU could obtain or otherwise determine data related to a particular vehicle-system and/or data related to a different vehicle-system, and the ECU could then control the particular vehicle-system based on that data. Such data may include sensor data received from a sensor that is coupled to the particular vehicle-system, sensor data received from a sensor that is coupled to the different vehicle-system, and/or data received from a different ECU of the vehicle, among other options. Moreover, the ECU may use that data in various ways as basis for controlling the particular vehicle-system. For example, a TCM may use received sensor data and data received from an ECM to determine how and when to change gears in the vehicle for optimal fuel economy, among other options. Other examples are possible as well.

Generally, data related to a vehicle-system may represent one or more conditions each respectively encountered by that vehicle-system at a certain time and/or over a certain time period. In particular, a condition may be any physical phenomena exhibited by the vehicle-system that is measurable (e.g., using a sensor) and quantifiable in some way. For example, the condition may be a temperature of the vehicle-system, an orientation of the vehicle-system, or motion of the vehicle-system, among other options. Additionally or alternatively, a condition may be any physical phenomena externally applied to the vehicle-system so as to operate the vehicle-system. For example, the condition may be a voltage applied to the vehicle-system, a load applied to the vehicle-system, or a setting at which the vehicle-system is operated, among other options. As such, one or more of these conditions may help define a state of a vehicle-system.

In accordance with the present disclosure, a processor may receive data (hereinafter vehicle-system data) from one or more ECUs of a particular vehicle, which may include information about a state of one or more vehicle-systems of the particular vehicle.

In one case, the vehicle-system data may be sensor data that an ECU received and thus the information in the vehicle-system data may be value(s) or the like related to measurable condition(s) of the vehicle-system(s). For example, the processor may receive image data including an image of the vehicle-system, audio data including a recording of a sound outputted by the vehicle-system, temperature data including a temperature of the vehicle-system, and/or motion data specifying a movement of the vehicle-system. Other examples are also possible.

In another case, the vehicle-system data may be operational data generated by the ECU and thus the information in the vehicle-system data may be value(s) or the like related to externally applied input to the vehicle-system(s). For example, the processor may receive data specifying a voltage applied to a vehicle-system, a load applied to a vehicle-system, and/or an operating mode/setting at which a vehicle-system is operated. Other examples are also possible.

In yet another case, the vehicle-system data may include information about a vehicle-symptom that a vehicle-system exhibits. In particular, an ECU may determine the vehicle-symptom based on sensor data and/or other data that the ECU receives, among other factors. And the processor may then receive from the ECU vehicle-system data that include information about the vehicle-symptom. For example, the processor may receive textual, audio, and/or image data indicative of a vehicle-symptom associated with a vehicle-system (e.g., text specifying an "Engine Coolant Temperature Circuit Malfunction"). In another example, the processor may receive data specifying a DTC indicative of a vehicle-symptom associated with a vehicle-system (e.g., P0115). Other examples are also possible.

In yet another case, the vehicle-system data may include information about a candidate vehicle repair procedure to resolve a vehicle-symptom associated with a vehicle-system. In particular, an ECU may be an advanced ECU that is configured to determine a candidate vehicle repair procedure (e.g., an LOC and/or other procedure) based on a determined vehicle-symptom, sensor data that the ECU receives and/or other data that the ECU receives, among other factors. And the processor may then receive from the ECU vehicle-system data that includes information about the candidate vehicle repair procedure. For example, the processor may receive textual, audio, and/or image data indicative of the candidate vehicle repair procedure (e.g., text specifying to "recalibrate MAF sensor"). In another example, the processor may receive data specifying an LOC indicative of a particular operation that could be performed to a vehicle to resolve a particular vehicle-symptom associated with a particular vehicle-system of the vehicle (e.g., C772). Other examples are also possible.

In yet another case, the vehicle-system data may include identification information related to the vehicle itself. For example, the vehicle-system data may specify a vehicle identification number (VIN) of the vehicle and/or any one of the above-mentioned vehicle attributes with relation to the vehicle, among other possibilities. In yet another example, the vehicle-system data may specify an identifier of a vehicle-system, such as a manufacturer and/or a model of the vehicle-system, among others. Other cases and examples are also possible.

Furthermore, the processor may receive vehicle-system data from an ECU in one or more of various ways. In particular, a computing system (e.g., VRT 300) in which the processor is found may include a communication interface (e.g., network interface 306) through which the processor may receive and/or send data. Generally, such a communication interface may include a wired communication interface operable for engaging in wired transfer of data and/or may include a wireless communication interface operable for engaging in wireless transfer of data. Accordingly, in one case, assuming that an ECU also includes such a communication interface, the processor may directly receive vehicle-system data from that ECU via the communication interface of the computing system. In another case, however, another computing device may receive vehicle-system data from the ECU via a communication interface of the other computing device, and the processor may then receive that vehicle-system data from the other computing device via the communication interface of the computing system. Other cases are also possible.

In a system arranged as described above, the processor may determine in various ways the particular vehicle-system data that should be received from an ECU and/or which particular ECU to query for that particular vehicle-system data.

In one situation, the processor may receive a manual request that is provided (e.g., by a user) via a user interface (e.g., user interface 302). Based on the manual request, the processor may determine the particular ECU to query and the particular vehicle-system data for which to query the particular ECU, and the processor may then receive the particular vehicle-system data from the particular ECU in response to querying that particular ECU. For example, the manual request may be a request for information about the vehicle's engine due to a check engine light being on and, based on this manual request, the processor may determine that an ECM should be queried for a candidate vehicle repair procedure that may resolve the issue of the check engine light being on. As such, the processor may query the ECM in this manner and may responsively receive from the ECM a candidate vehicle repair procedure (e.g., an LOC) that may resolve the issue. Other examples are also possible.

In another situation, data storage (e.g., data storage 308) may have stored thereon a predetermined request based on which to query ECU(s), and the processor may query ECU(s) in accordance with the predetermined request. For instance, the predetermined request may indicate that the processor should query a particular ECU for any vehicle-symptom(s) and/or candidate vehicle repair procedure(s) that the particular ECU determined, and the processor may thus do so and may receive such vehicle-symptom(s) and/or candidate vehicle repair procedure(s) from the particular ECU. In a specific example, the predetermined request may indicate that the processor should query the vehicle's TCM for any vehicle-symptoms that the TCM determined, and the processor may thus do so and may receive a DTC of P0710, which is indicative of a transmission fluid temperature sensor circuit malfunction. Other examples are also possible.

In yet another situation, the processor may determine the particular vehicle-system data that should be received from an ECU and/or which particular ECU to query for that particular vehicle-system data based on other input data that the processor receives. In particular, as further discussed below, the processor may receive, from one or more data sources other than a particular vehicle's ECU(s), other input data indicative of a state of the particular vehicle. As noted below, such other data may be textual data including a written description of the state of the particular vehicle, speech data including a spoken-language description of the state of the particular vehicle, and/or historical repair data including information related to one or more vehicle repairs previously carried out for the particular vehicle, among other options. Accordingly, the processor may use such other input data as basis for determining the ECU(s) to query and/or the vehicle-system data that should be received.

More specifically, the processor may make a determination that the other input data is indicative of a particular vehicle-system of the particular vehicle, and may responsively transmit to an ECU of the particular vehicle a request for information about a state of the particular vehicle-system. Thus, the processor may receive the requested information in response to the request. For example, the processor may make a determination that textual data includes the phrase "engine is making noise" and may determine (e.g., using the taxonomy term database 216) that the phrase is indicative of a problem with the particular vehicle's engine. Consequently, the processor may responsively transmit to the particular vehicle's ECM a request for information about a state of the engine, and the processor may receive an LOC of "C085" indicating that the engine's oil and filter should be changed. Other examples are also possible.

In this regard, the processor may also identify in one of various ways the particular ECU that should be queried so as to receive the information about the state of the particular vehicle-system. For example, data storage (e.g., data storage 308) may have stored thereon mapping data that maps each of various vehicle-systems respectively with one or more ECU identifiers. In this example, the processor may use the mapping data as basis to determine particular ECU identifier (s) that are associated with a particular vehicle-system for which information is needed. Once determined, the processor may engage in communications with one or more particular ECUs that are identified according to the determined identifier(s). Other examples are also possible.

Moreover, the processor may also determine in various ways the particular information to request from the ECU(s). In one case, the processor may request an ECU for any vehicle-symptoms and/or candidate vehicle repair procedures that the ECU itself determined. In another case, however, the processor may make a determination that the other input data is indicative of a particular vehicle-symptom and/or of a particular candidate repair procedure to resolve that particular vehicle-symptom. In this case, the processor may request from ECU(s) information related to the particular vehicle-symptom and/or the particular candidate repair procedure, and thus may receive that information from the ECU(s). By way of example, the processor may make a determination that historical repair data for the vehicle indicates that an MAF sensor of the particular vehicle has been previously calibrated. Responsively, the processor may query the particular vehicle's ECM to request information about a calibration state of the MAF sensor, and may then receive that information in response to the request. Other examples are also possible.

In some situations, the processor may have already received vehicle-system data in accordance with the discussion above and perhaps may have already stored the received vehicle-system data in data storage (e.g., data storage 308). In such situations, the processor could also use other input data as basis to identify a portion of the previously received vehicle-system data that includes information that should be used as basis for automatically generating an RO in accordance with the present disclosure.

Specifically, the processor may make a determination that the other input data is indicative of a particular vehicle-system of a particular vehicle, and may responsively identify a portion of the previously received vehicle-system data that includes information about a state of the particular vehicle-system. For example, when the processor receives certain vehicle-system data, the processor may tag that vehicle-system data with meta-data that indicates the particular vehicle-system associated with the received vehicle-system data, such as by specifying in the meta-data an ECU identifier of an ECU from which the vehicle-system data was received, for instance. In this example, the processor may use such meta-data to identify any vehicle-system data that is associated with the particular vehicle-system and that therefore includes information about the state of the particular vehicle-system. Other examples are possible as well.

Further, the processor may also determine the particular information to identify among the previously received vehicle-system data. In particular, the processor may make a determination that the other input data is indicative of a particular vehicle-symptom and/or of a particular candidate repair procedure to resolve that particular vehicle-symptom. In this case, the processor may identify a portion of the received vehicle-system data that includes information related to the particular vehicle-symptom and/or the particular candidate repair procedure. By way of example, the processor may make a determination that historical repair data for the vehicle indicates that brakes of the particular vehicle have previously failed. Responsively, the processor may use meta-data to identify in the previously received vehicle-system data any vehicle-symptoms received from the particular vehicle's BCM. Other examples are also possible.

In a further aspect, receiving vehicle-system data from an ECU may involve receiving information from another system that has been directed by an ECU to output information in some way. For example, an ECU may cause a display device (e.g., of the vehicle) to display information related to a state of the vehicle and the processor may obtain the displayed information, such as by operating an image-capture device to obtain an image of the displayed information. Furthermore, the processor may then apply currently known optical character recognition (OCR) techniques to identify text within the obtained image, thereby determining text indicative of a state of the vehicle. In another example, an ECU may cause a speaker to output audio related to a state of the vehicle, and the processor may obtain the outputted audio, such as by operating a recording device to record the outputted audio. Furthermore, the processor may then apply currently known speech recognition techniques to evaluate the outputted audio, thereby determining speech indicative of a state of the vehicle. Other examples are also possible.

In yet a further aspect, receiving vehicle-system data from an ECU may involve receiving from an ECU an indication that no relevant data is available. For example, the processor may query an ECU for information related to a vehicle-symptom associated with a particular vehicle-system. Responsively, the processor may receive from the ECU an indication that no such vehicle-symptoms have been determined by the ECU. In practice, this may serve as an indication to the processor that there are no problems being experienced by the particular vehicle-system. Other aspects and examples are possible as well.

At block 604, method 600 involves receiving, by the at least one processer from one or more data sources other than the one or more ECUs, other input data indicative of a state of the particular vehicle.

As noted above, the processor may receive textual data, speech data, and/or historical repair data including information indicative of a state of a particular vehicle. In practice, the processor may receive such data from one or more data sources other than ECU(s). Although several such other data sources are described below by way of example, different data sources are possible as well without departing from the scope of the present disclosure.

In one case, as noted, the processor may receive textual data including a written description of a state of the vehicle. For example, the textual data may include a written description provided via a user interface, such as of a VRT or of a different device (e.g., a desktop computer). In practice, the written description could specifically be provided using a Short Message Service (SMS) message, an e-mail message, and/or a web-based application, among other options. As such, the processor may receive textual data including the written description from a computing device (e.g., the VRT including the processor or the desktop computer) and/or from a web server, among other possibilities. Further, the written description could include various words and/or phrases related to the state of the vehicle (e.g., "the brakes are not working properly"). Moreover, the processor may determine that the received textual data is associated with a particular vehicle in various ways, such as based on a VIN provided in the written description and/or a customer indicator provided in the written description, among other possibilities.

In another case, as noted, the processor may receive speech data including a spoken-language description of the state of the vehicle. For example, the textual data may include a spoken-language description provided via a microphone, such as of a VRT or of a different device (e.g., mobile phone). In practice, the spoken-language description could specifically be provided during a phone call and/or a call on a web-based application, among other options. As such, the processor may receive speech data including the spoken-language description from a computing device (e.g., the VRT including the processor or a mobile phone) and/or from a web server, among other possibilities. Further, the spoken-language description could include various words and/or phrases related to the state of the vehicle (e.g., "oil change was performed four months ago"), which could be determined by applying currently known recognition techniques and/or in other ways. Moreover, the processor may determine that the received speech data is associated with a particular vehicle in various ways, such as based on a VIN provided in the spoken-language description and/or a customer indicator provided in the spoken-language description, among other possibilities.

In yet another case, as noted, the processor may receive historical repair data including information related to one or more vehicle repairs previously carried out for the particular vehicle. For example, the processor may query the data storage device 210 to obtain one or more stored ROs 214 associated with the particular vehicle. To do so, for instance, the processor may provide an identifier (e.g., VIN) of the particular vehicle as part of the query, so that the VRD 200 can determine (e.g., based on meta-data 222) ROs 214 associated with the particular vehicle based on the provided identifier. Other cases and examples are also possible.

Furthermore, the processor may receive other input data from the other data sources in one or more of various ways. In accordance with the discussion above, for instance, a computing system (e.g., VRT 300) in which the processor is found may include a communication interface (e.g., network interface 306) through which the processor may receive and/or send data. As noted, such a communication interface may include a wired communication interface operable for engaging in wired transfer of data and/or may include a wireless communication interface operable for engaging in wireless transfer of data. Thus, assuming that the other data source also includes such a communication interface, the processor may receive other input data from that other data source via the communication interface of the computing system. Other approaches are also possible.

In a system arranged as described above, the processor may determine in various ways the other input data that should be received and/or which of the other data sources to query for that other input data.

In one situation, the processor may receive a manual request that is provided (e.g., by a user) via a user interface (e.g., user interface 302). Based on the manual request, the processor may determine the other data source to query and the other input data for which to query the determined other data source, and the processor may then receive the other input data from the determined other data source in response to the query. For example, the manual request may be a request for historical repairs carried out for a particular vehicle over a particular time period and, based on this manual request, a VRT's processor may determine that the VRD 200 should be queried for that information. As such, the processor may query the VRD 200 in this manner and may responsively receive from the VRD 200 each stored RO that is associated with the particular vehicle and with the particular time period. Other examples are also possible.

In another situation, data storage (e.g., data storage 308) may have stored thereon a predetermined request based on which to query another data source, and the processor may query the other data source in accordance with the predetermined request. For example, the predetermined request may be a predetermined question about the state of the vehicle, which could be presented in the form of text and/or speech. In this example, the processor may transmit that predetermined question to a computing device (e.g., the vehicle owners' computing device and/or a technician's computing device), and the processor may then receive from the computing device speech and/or textual data including an answer to the predetermined question. Other examples are also possible.

In yet another situation, the processor may determine the other input data that should be received and/or which of the other data sources to query for that other input data based on vehicle-system data that the processor receives. More specifically, the processor may make a determination that the received vehicle-system data is indicative of a state of a particular vehicle-system of the particular vehicle, and may responsively transmit to another data source a request for additional information about the state of that particular vehicle-system. As a result, the processor may receive the requested information in response to the request.

By way of example, the processor may make a determination that vehicle-system data includes a DTC of P0500, which is indicative of a problem with the particular vehicle's speed sensor. In this example, the processor may responsively query the VRD 200 to request stored ROs that are associated with the particular vehicle and that specify repairs and/or other information about particular vehicle's speed sensor. And the processor may then receive such ROs from the VRD 200. Additionally or alternatively, the processor may transmit a predetermined question to a computing device, which may ask "has the speed sensor been recalibrated this year?" And the processor may then receive from the computing device speech and/or textual data including an answer to the predetermined question, which could be a "yes" or a "no". Other examples are also possible.

In this regard, the processor may also identify in one of various ways the particular data source that should be queried so as to receive the additional information about the state of the particular vehicle-system. For instance, data storage (e.g., data storage 308) may have stored thereon mapping data that maps each of various types of information respectively with one or other data sources that may include the respective type of information. So the processor may use the mapping data as basis to determine another data source that may include the type of information to be requested and may then engage in communications with that other data to obtain that information. By way of example, the processor may determine that information to be request should include information regarding a most recent oil change carried out for the particular vehicle, and may determine based on the mapping data that such information could be received either by querying the VRD 200 for historical repair information or by transmitting a predetermined question to the vehicle owners' computing device. Other examples are also possible.

Moreover, the processor may also determine in various ways the particular information to request from the other data source. For instance, the processor may make a determination that the received vehicle-system data is indicative of a particular vehicle-symptom and/or of a particular candidate repair procedure to resolve that particular vehicle-symptom. So the processor may request from the other data source additional information related to the particular vehicle-symptom and/or the particular candidate repair procedure, and thus may receive that information from the other data source. By way of example, the processor may make a determination that received vehicle-system data indicates that the engine's temperature exceeds a threshold high temperature. Responsively, the processor may query the VRD 200 to request stored ROs that are associated with the particular vehicle and that specify repairs to the particular vehicle's engine, and the processor may then receive that information in response to the request. Other examples are also possible.

In some situations, the processor may have already received other input data in accordance with the discussion above and perhaps may have already stored the received other input data in data storage (e.g., data storage 308). In such situations, the processor may use received vehicle-system data as basis to identify a portion of the previously received other input data that includes information that should be used as basis for automatically generating an RO in accordance with the present disclosure.

Specifically, the processor may make a determination that received vehicle-system data includes information about a state of a particular vehicle-system of a particular vehicle, and may responsively identify a portion of the received other input data that includes additional information about the state of the particular vehicle-system. For instance, when the processor receives certain other input data, the processor may store meta-data that indicates the particular vehicle-system associated with the received other input data. By way of example, the processor may receive from the VRD 200 meta-data 222 associated with a received RO and that meta-data 222 may indicate a vehicle-system for which repairs in the RO were carried out. As such, the processor may use such meta-data to identify other input data that is associated with the particular vehicle-system and that therefore includes additional information about the state of the particular vehicle-system. Other examples are possible as well.

Further, the processor may also determine the particular information to identify among the received other input data. In particular, the processor may make a determination that vehicle-system data is indicative of a particular vehicle-symptom and/or of a particular candidate repair procedure to resolve that particular vehicle-symptom. In this case, the processor may identify a portion of the received other input data that includes additional information related to the particular vehicle-symptom and/or the particular candidate repair procedure. By way of example, the processor may make a determination that vehicle-system data includes a DTC P0700, which is representative of a problem with the particular vehicle's transmission. Responsively, the processor may identify any previously received textual data that is associated with the particular vehicle and that includes the word "transmission". Other examples are also possible.

At block 606, method 600 involves, based on the vehicle-system data and on the other input data, determining, by the at least one processor, repair information to be specified in a repair order (RO) associated with the particular vehicle.

In accordance with the present disclosure, the processor may use the vehicle-system data in combination with other input data as basis for determining repair information that should be specified in a repair order. In doing so, as an initial matter, the processor may evaluate the data so as determine whether one or both of the vehicle-system data and the other input data are indicative of a particular vehicle-symptom and/or of a particular candidate repair procedure. Such evaluation of the data may take various forms.

In one case, received vehicle-system data may be or may otherwise include sensor data originally received by an ECU (as noted above), and the processor may determine that vehicle-system data is indicative of a particular vehicle-symptom by determining that the sensor data is indicative of the particular vehicle-symptom. To do so, for instance, the processor may refer to mapping data (e.g., at data storage) that maps each of various characteristics of sensor data respectively with one or more vehicle-symptoms that the respective characteristics indicate may be exhibited. Based on the mapping data, the processor may determine that characteristics of the sensor data (e.g., a temperature level indicated by the sensor data) originally received by the ECU correspond to the particular vehicle-symptom. Note that mapping data described herein could be established via manual engineering input and/or by a processor (e.g., by applying machine learning techniques).

In another case, received vehicle-system data may be operational data generated by the ECU (as noted above), and the processor may determine that vehicle-system data is indicative of a particular vehicle-symptom by determining that the operational data is indicative of the particular vehicle-symptom. To do so, for instance, the processor may refer to mapping data (e.g., at data storage) that maps each of various characteristics of operational data respectively with one or more vehicle-symptoms that the respective characteristics indicate may be exhibited. Based on the mapping data, the processor may determine that characteristics of the operational data (e.g., an operating mode at which a vehicle-system was operated) generated by the ECU correspond to the particular vehicle-symptom.

In yet another case, received vehicle-system data may include information about a vehicle-symptom that a vehicle-system exhibits (as noted above), and the processor may determine that vehicle-system data is indicative of a particular vehicle-symptom by determining that the vehicle-system data includes information about the particular vehicle-symptom. For example, the processor may determine that the vehicle-system data includes a particular DTC and may thus determine that the vehicle-system data is indicative of that particular DTC.

In yet another case, received vehicle-system data may include information about a candidate vehicle repair procedure to resolve a vehicle-symptom associated with a vehicle-system (as noted above), and the processor may determine that vehicle-system data is indicative of a particular vehicle-symptom by determining that the candidate vehicle repair procedure at issue is a candidate to help resolve the particular vehicle-symptom, and the processor may do so in various ways. In one example, the candidate vehicle repair procedure may specify (e.g., using meta-data) the vehicle-symptom that this procedure is meant to help resolve, and thus the processor may determine that vehicle-system data is indicative of the particular vehicle-symptom by determining that candidate vehicle repair procedure may specify the particular vehicle-symptom. In another example, the processor may refer to mapping data (e.g., at data storage) that maps each of various candidate vehicle repair procedure respectively with one or more vehicle-symptoms that the respective procedure is meant to help resolve. Based on the mapping data, the processor may determine that the candidate vehicle repair procedure corresponds to the particular vehicle-symptom. Other examples are also possible.

In yet another case, received vehicle-system data may be or may otherwise include sensor data originally received by an ECU (as noted above), and the processor may determine that vehicle-system data is indicative of a particular candidate vehicle repair procedure by determining that the sensor data is indicative of the particular candidate vehicle repair procedure. To do so, for instance, the processor may refer to mapping data (e.g., at data storage) that maps each of various characteristics of sensor data respectively with one or more candidate vehicle repair procedures that the respective characteristics indicate should be carried out. For example, in practice such mapping data may be or may otherwise be based on a labor time guide and/or a service manual, among other possibilities. Nonetheless, based on the mapping data, the processor may determine that characteristics of the sensor data (e.g., fluid pressure level indicated by the sensor data) originally received by the ECU correspond to the particular candidate vehicle repair procedure.

In yet another case, received vehicle-system data may be operational data generated by the ECU (as noted above), and the processor may determine that vehicle-system data is indicative of a particular candidate vehicle repair procedure by determining that the operational data is indicative of the particular candidate vehicle repair procedure. To do so, for instance, the processor may refer to mapping data (e.g., at data storage) that maps each of various characteristics of operational data respectively with one or more candidate vehicle repair procedures that the respective characteristics indicate should be carried out. Based on the mapping data, the processor may determine that characteristics of the operational data (e.g., a voltage level applied to a vehicle-system) generated by the ECU correspond to the particular candidate vehicle repair procedure.

In yet another case, received vehicle-system data may include information about a vehicle-symptom that a vehicle-system exhibits (as noted above), and the processor may determine that vehicle-system data is indicative of a particular candidate vehicle repair procedure by determining that the vehicle-symptom at issue could potentially be resolved by the particular candidate vehicle repair procedure. To do so, for instance, the processor may refer to mapping data (e.g., at data storage) that maps each of various vehicle-symptoms respectively with one or more candidate vehicle repair procedures that could help resolve the respective vehicle-symptom. Based on the mapping data, the processor may determine that the vehicle-symptom corresponds to the particular candidate vehicle repair procedure.

In yet another case, received vehicle-system data may include information about a candidate vehicle repair procedure to resolve a vehicle-symptom associated with a vehicle-system (as noted above), and the processor may determine that vehicle-system data is indicative of a particular candidate vehicle repair procedure by determining that the vehicle-system data includes information about the particular candidate vehicle repair procedure. For example, the processor may determine that the vehicle-system data includes a particular LOC and may thus determine that the vehicle-system data is indicative of that particular LOC.

In yet another case, received other input data may include information about a vehicle-symptom (as noted above), and the processor may determine that the other input data is indicative of a particular vehicle-symptom by determining that the other input data includes information about the particular vehicle-symptom. For example, the processor may determine that textual data is indicative of the particular vehicle-symptom by determining that the textual data includes a written description of the particular vehicle-symptom and/or by determining that the textual data includes a written description of a candidate vehicle repair procedure that is meant to help resolve the particular vehicle-symptom. In another example, the processor may determine that speech data is indicative of the particular vehicle-symptom by determining that the speech data includes a spoken-language description of the particular vehicle-symptom and/or by determining that the speech data includes a spoken-language description of a candidate vehicle repair procedure that is meant to help resolve the particular vehicle-symptom. In yet another example, the processor may determine that historical repair data is indicative of the particular vehicle-symptom by determining that a stored RO includes searchable text and/or symbols that specify the particular vehicle-symptom and/or by determining that a stored RO includes searchable text and/or symbols that specify a previously carried out vehicle repair procedure that helped resolve the particular vehicle-symptom.

In yet another case, received other input data may include information about a candidate vehicle repair procedure (as noted above), and the processor may determine that the other input data is indicative of a particular candidate vehicle repair procedure by determining that the other input data includes information about the particular candidate vehicle repair procedure. For example, the processor may determine that textual data is indicative of the particular candidate vehicle repair procedure by determining that the textual data includes a written description of the particular candidate vehicle repair procedure and/or by determining that the textual data includes a written description of a vehicle-symptom that could be resolved by the particular candidate vehicle repair procedure. In another example, the processor may determine that speech data is indicative of the particular candidate vehicle repair procedure by determining that the speech data includes a spoken-language description of the particular candidate vehicle repair procedure and/or by determining that the speech data includes a spoken-language description of a vehicle-symptom that could be resolved by the particular candidate vehicle repair procedure. In yet another example, the processor may determine that historical repair data is indicative of the particular candidate vehicle repair procedure by determining that a stored RO includes searchable text and/or symbols that specify that the particular candidate vehicle repair procedure has been previously carried out and/or by determining that a stored RO includes searchable text and/or symbols that specify a vehicle-symptom that could be resolved by the particular candidate vehicle repair procedure. Other cases and examples are possible as well.

Once the processor evaluates the data, the processor may the use the evaluation as basis for determining repair information that should be specified in a repair order. In accordance with the present disclosure, such repair information could include one or more vehicle-symptoms. In practice, if such vehicle-symptom(s) are ultimately specified in a repair order, a technician and/or a customer may be able to determine the repair procedure(s) to carry out to resolve those vehicle-symptom(s). Additionally or alternatively, such repair information could include one or more candidate vehicle repair procedures. In practice, if such candidate vehicle repair procedures are ultimately specified in a repair order, a technician and/or a customer may have information regarding vehicle procedure(s) that could help resolve issues with a vehicle and thus may carry out one or more of the specified vehicle repairs.

Accordingly, as noted, the processor may use the vehicle-system data in combination with other input data as basis for determining repair information that should be specified in a repair order. Although various approaches for using such combination of data to determine repair information are discussed below, other approaches are possible as well without departing from the scope of the present disclosure.

In one case, the processor may determine that received vehicle-system data is indicative of a particular vehicle-symptom associated with a particular vehicle and may determine that received other input data is also indicative of the particular vehicle-symptom associated with the particular vehicle. Based on the vehicle-system data and the other input data both being indicative of the particular vehicle-symptom, the processor may determine that the particular vehicle-symptom is to be specified in an RO associated with the particular vehicle.

By way of example, the processor may determine that received vehicle-system data is indicative of a DTC "P0171" with regards to the particular vehicle and may also determine that received other input data is also indicative of the DTC "P0171" with regards to the particular vehicle. Based on the vehicle-system data and the other input data both being indicative of the DTC "P0171", the processor may determine that the DTC "P0171" is to be specified in an RO associated with the particular vehicle. Other examples are also possible.

In another case, the processor may determine that received vehicle-system data is indicative of a particular vehicle-symptom associated with the particular vehicle and may also determine that received other input data is indicative of the particular vehicle-symptom associated with the particular vehicle. Based on the vehicle-system data and the other input data both being indicative of the particular vehicle-symptom associated with the particular vehicle, the processor may determine a vehicle repair procedure that resolves the particular vehicle-symptom (e.g., using mapping data as discussed above). Thus, the processor may determine that the determined vehicle repair procedure is to be specified in an RO associated with the particular vehicle.

By way of example, the processor may determine that received vehicle-system data is indicative of a DTC "P0100" with regards to the particular vehicle and may also determine that received other input data is also indicative of the DTC "P0100" with regards to the particular vehicle. This DTC "P0100" may indicate a problem with an MAF sensor of the particular vehicle. So based on the vehicle-system data and the other input data both being indicative of the DTC "P0100", the processor may determine that a recalibration of the MAF sensor may help resolve the DTC "P0100". Thus, the processor may determine that the recalibration of the MAF sensor is to be specified in an RO associated with the particular vehicle. Other examples are also possible.

In yet another case, the processor may determine that received vehicle-system data is indicative of a first vehicle-symptom associated with the particular vehicle and, based on the vehicle-system data being indicative of the first vehicle-symptom associated with the particular vehicle, the processor may determine that the first vehicle-symptom is to be specified in an RO associated with the particular vehicle. In this case, the processor may also determine that received other input data is indicative of a different second vehicle-symptom associated with the particular vehicle and, based on the other input data being indicative of the second vehicle-symptom associated with the particular vehicle, the processor may determine that the second vehicle-symptom is also to be specified in the RO associated with the particular vehicle.

By way of example, the processor may determine that received vehicle-system data is indicative of a DTC "P0171" with regards to the particular vehicle and may also determine that received other input data is indicative of the DTC "P0100" with regards to the particular vehicle. So based on the vehicle-system data being indicative of the DTC "P0171", the processor may determine that the DTC "P0171" is to be specified in an RO associated with the particular vehicle. Additionally, based on the other input data being indicative of the DTC "P0100", the processor may determine that the DTC "P0100" is also to be specified in an RO associated with the particular vehicle. Other examples are also possible.

In yet another case, the processor may determine that received vehicle-system data is indicative of a first vehicle-symptom associated with the particular vehicle and may also determine that received other input data is indicative of a different second vehicle-symptom associated with the particular vehicle. Then, the processor may determine a vehicle repair procedure that resolves both the first and second vehicle-symptoms associated with the particular vehicle (e.g., using mapping data as discussed above). Thus, the processor may determine that the determined vehicle repair procedure is to be specified in an RO associated with the particular vehicle.

By way of example, the processor may determine that received vehicle-system data is indicative of a DTC "P0301" with regards to the particular vehicle, which is representative of a misfire being detected on a first cylinder of the particular vehicle. Additionally, the processor may determine that received other input data is indicative of the DTC "P0302" with regards to the particular vehicle, which is representative of a misfire being detected on a second cylinder of the particular vehicle. Based on the vehicle-system data being indicative of the DTC"P0301" and the other input data both being indicative of the DTC "P0302", the processor may determine that a replacement of the particular vehicle's ignition system is needed. Thus, the processor may determine that the replacement of the particular vehicle's ignition system is to be specified in an RO associated with the particular vehicle. Other examples are also possible.

In yet another case, the processor may determine that received vehicle-system data is indicative of a candidate vehicle repair procedure to resolve a particular vehicle-symptom associated with the particular vehicle and may determine that received other input data is also indicative of the candidate vehicle repair procedure to resolve the particular vehicle-symptom associated with the particular vehicle. Based on the vehicle-system data and the other input data both being indicative of the candidate vehicle repair procedure to resolve the particular vehicle-symptom associated with the particular vehicle, the processor may determine that the candidate vehicle repair procedure is to be specified in an RO associated with the particular vehicle.

By way of example, the processor may determine that received vehicle-system data is indicative of a particular repositioning of the particular vehicle's camshaft position sensor and may determine that received other input data is also indicative of the particular repositioning of the particular vehicle's camshaft position sensor. Based on the vehicle-system data and the other input data both being indicative of the particular repositioning of the particular vehicle's camshaft position sensor, the processor may determine that the particular repositioning of the particular vehicle's camshaft position sensor is to be specified in an RO associated with the particular vehicle. Other examples are also possible.

In yet another case, the processor may determine that received vehicle-system data is indicative of a candidate vehicle repair procedure to resolve a particular vehicle-symptom associated with the particular vehicle and may determine that received other input data is also indicative of the candidate vehicle repair procedure to resolve the particular vehicle-symptom associated with the particular vehicle. Based on the vehicle-system data and the other input data both being indicative of the candidate vehicle repair procedure to resolve the particular vehicle-symptom associated with the particular vehicle, the processor may determine that the particular vehicle-symptom is to be specified in an RO associated with the particular vehicle.

By way of example, the processor may determine that received vehicle-system data is indicative of a cleaning of Exhaust Gas Recirculation (EGR) ports and may determine that received other input data is also indicative of the cleaning of the EGR ports. Generally, a cleaning of an EGR port may be carried out to resolve a DTC "P0400", which is representative of an EGR flow malfunction. Thus, based on the vehicle-system data and the other input data both being indicative of the cleaning of the EGR ports, the processor may determine that the DTC "P0400" is to be specified in an RO associated with the particular vehicle. Other examples are also possible.

In yet another case, the processor may determine that received vehicle-system data is indicative of a first candidate vehicle repair procedure to resolve a first vehicle-symptom associated with the particular vehicle and, based on the vehicle-system data being indicative of the first candidate vehicle repair procedure to resolve the first vehicle-symptom associated with the particular vehicle, the processor may determine that the first candidate vehicle repair procedure is to be specified in an RO associated with the particular vehicle. Additionally, the processor may determine that received input other input data is indicative of a second candidate vehicle repair procedure to resolve a second vehicle-symptom (e.g., could be the same as or different from the first vehicle-symptom) associated with the particular vehicle and, based on the other input data being indicative of the second candidate vehicle repair procedure to resolve the second vehicle-symptom associated with the particular vehicle, the processor may determine that the second candidate vehicle repair procedure is also to be specified in the RO associated with the particular vehicle.

By way of example, the processor may determine that received vehicle-system data is indicative of an LOC "C117" with regards to the particular vehicle and may also determine that received other input data is indicative of an LOC "C245" with regards to the particular vehicle. So based on the vehicle-system data being indicative of the LOC "C117", the processor may determine that the LOC "C117" is to be specified in an RO associated with the particular vehicle. Additionally, based on the other input data being indicative of the LOC "C245", the processor may determine that the LOC "C245" is also to be specified in an RO associated with the particular vehicle. Other examples are also possible.

In yet another case, the processor may determine that received vehicle-system data is indicative of a first candidate vehicle repair procedure to resolve a first vehicle-symptom associated with the particular vehicle and, based on the vehicle-system data being indicative of the first candidate vehicle repair procedure to resolve the first vehicle-symptom associated with the particular vehicle, the processor may determine that the first vehicle-symptom is to be specified in the RO associated with the particular vehicle. Additionally, the processor may determine that received other input data is indicative of a second candidate vehicle repair procedure to resolve a different second vehicle-symptom associated with the particular vehicle and, based on the other input data being indicative of the second candidate vehicle repair procedure to resolve the second vehicle-symptom associated with the particular vehicle, the processor may determine that the second vehicle-symptom is also to be specified in the RO associated with the particular vehicle.

By way of example, the processor may determine that received vehicle-system data is indicative of a cleaning of the particular vehicle's EGR ports and may determine that such cleaning of the particular vehicle's the EGR ports may help resolve a DTC "P0400", which is representative of an EGR flow malfunction as noted above. So based on vehicle-system data being indicative of the cleaning of the particular vehicle's EGR ports, the processor may determine that DTC "P0400" is to be specified in an RO associated with the particular vehicle. Additionally, the processor may determine that received other input data is indicative of a particular repositioning of the particular vehicle's camshaft position sensor and may determine that such particular repositioning of the particular vehicle's camshaft position sensor may help resolve a DTC "P0340", which is representative of camshaft position sensor circuit malfunction. So based on the other input data being indicative of the particular repositioning of the particular vehicle's camshaft position sensor, the processor may determine that DTC "P0340" is also to be specified in the RO associated with the particular vehicle. Other examples are also possible.

In yet another case, the processor may determine that received vehicle-system data is indicative of a first candidate vehicle repair procedure to resolve a particular vehicle-symptom associated with the particular vehicle and may also determine that received other input data is indicative of a second candidate vehicle repair procedure to resolve that particular vehicle-symptom associated with the particular vehicle. Based on the vehicle-system data being indicative of the first candidate vehicle repair procedure to resolve the particular vehicle-symptom and on the other input data being indicative of the second candidate vehicle repair procedure to resolve that same particular vehicle-symptom, the processor may determine that the particular vehicle-symptom is to be specified in an RO associated with the particular vehicle.

By way of example, the processor may determine that received vehicle-system data is indicative of a cleaning of the particular vehicle's MAF sensor and may determine that such cleaning of the particular vehicle's MAF sensor may help resolve a DTC "P0100", which is representative of a problem with particular vehicle's MAF sensor as noted above. Additionally, the processor may determine that received other input data is indicative of a recalibration of the particular vehicle's MAF sensor and may determine that such recalibration of the particular vehicle's MAF sensor may also help resolve the DTC "P0100". Thus, based on the vehicle-system data being of the cleaning of the particular vehicle's MAF sensor and on the other input data being indicative of the recalibration of the particular vehicle's MAF sensor, the processor may determine that the DTC "P0100" is to be specified in an RO associated with the particular vehicle. Other examples are also possible.

In yet another case, the processor may determine that received vehicle-system data is indicative of a particular vehicle-symptom associated with the particular vehicle and may determine that received other input data is indicative of a candidate vehicle repair procedure to resolve that particular vehicle-symptom. Based on the vehicle-system data being indicative of the particular vehicle-symptom associated with the particular vehicle and on the other input data being indicative of the candidate vehicle repair procedure to resolve that same particular vehicle-symptom, the processor may determine that the candidate vehicle repair procedure is to be specified in an RO associated with the particular vehicle and/or may determine that particular vehicle-symptom is to be specified in the RO associated with the particular vehicle.

By way of example, the processor may determine that received vehicle-system data is indicative of a DTC "P0195", which is representative of an engine oil temperature sensor malfunction. Additionally, the processor may determine that received other input data is indicative of a recalibration of the particular vehicle's engine oil temperature sensor and may determine that such recalibration of the particular vehicle's engine oil temperature sensor may help resolve the DTC "P0195". Thus, based on the vehicle-system data being indicative of the DTC "P0195" and on the other input data being indicative of the recalibration of the particular vehicle's engine oil temperature, the processor may determine that the DTC "P0195" is to be specified in an RO associated with the particular vehicle and/or may determine that the recalibration of the particular vehicle's engine oil temperature is to be specified in the RO associated with the particular vehicle. Other examples are also possible.

In yet another case, the processor may determine that received vehicle-system data is indicative of a candidate vehicle repair procedure to resolve a particular vehicle-symptom associated with the particular vehicle and may also determine that received other input data is indicative of that particular vehicle-symptom. Based on the vehicle-system data being indicative of the candidate vehicle repair procedure to resolve the particular vehicle-symptom associated with the particular vehicle and on the other input data being indicative of that same particular vehicle-symptom, the processor may determine that the candidate vehicle repair procedure is to be specified in an RO associated with the particular vehicle and/or may determine that the particular vehicle-symptom is to be specified in the RO associated with the particular vehicle.

By way of example, the processor may determine that received vehicle-system data is indicative of a particular reconfiguration to the particular vehicle's transmission control system and may determine that such a particular reconfiguration to the particular vehicle's transmission control system may help resolve a DTC "P0700", which is representative of a transmission control system malfunction. Additionally, the processor may determine that received other input data is indicative of the DTC "P0700" with regards to the particular vehicle. Thus, based on the received vehicle-data being indicative of the particular reconfiguration to the particular vehicle's transmission control system and on the receive other input data being indicative of the DTC "P0700", the processor may determine that the particular reconfiguration to the particular vehicle's transmission control system is to be specified in an RO associated with the particular vehicle and/or may determine that the DTC "P0700" is to be specified in the RO associated with the particular vehicle. Other cases and examples are also possible.

At block 608, method 600 involves generating, by the at least one processor, an RO specifying at least the determined repair information, wherein the generated RO is associated with the particular vehicle.

Once the processor has determined repair information to be specified in an RO associated with the particular vehicle, the processor may then generate the RO such that the determined repair information is specified in the RO. In some cases, the processor may also generate the RO so that the RO includes additional relevant information other than the repair information. In either case, the process of generating an RO could take one of various forms, some of which are described below.

In an example implementation, the processor may generate data that includes information specifying the determined repair information. In particular, generating this data may involve the processor creating new data that includes at least of portion of the determined repair information and the processor then storing the created data in data storage. Additionally or alternatively, generating this data may involve the processor copying and/or moving to the data storage at least a portion of the vehicle-system data and/or other input data that specifies or is otherwise indicative of the determined repair information.

By way of example, the determined repair information to be specified may include the cleaning of the particular vehicle's EGR ports, the DTC "P0400", the particular repositioning of the particular vehicle's camshaft position sensor, and the DTC "P0340". In this example, the processor may create data that specifies the cleaning of the particular vehicle's EGR ports and the DTC "P0400", and may then store the created data in data storage. Also, the processor may copy received other input data and/or vehicle-system data that specifies the particular repositioning of the particular vehicle's camshaft position sensor and the DTC "P0340", and may then store the copied data in the data storage. Further, to the extent that other input data and/or vehicle-system data specify other information indicative of the particular repositioning of the particular vehicle's camshaft position sensor and/or the DTC "P0340", such as sensor data indicative of the DTC "P0340" for instance, the processor may also copy that data as well, so that this other information is also specified in the RO. Other examples are also possible.

Furthermore, the processor may also generate the RO so that the RO includes additional information other than the repair information. To do so, the processor may carry out creation of data, copying of data, and/or moving of data in line with the discussion above. Specifically, such creation, coping, and/or moving data may be based on or may otherwise include information found in data storage (e.g., data storage device 210 and/or data storage 308), in vehicle-system data, and/or in other input data, among other possibilities. In practice, the additional information to be included in the RO could take various forms.

In one example, the additional information may be information about the particular vehicle for which the RO is being generated, such the particular vehicle's VIN, vehicle attributes, and/or mileage, among others. In another example, the additional information may be information about the customer/owner of the particular vehicle for which the RO is being generated, such as a customer indicator, among others. In yet another example, the additional information may be information about the service provider, such as a service provider identifier, among others. In yet another example, the additional information may include a date that a service is provided and/or a date that the RO is generated, among others. In yet another example, the additional information may include estimated and/or actual cost of labor and/or of vehicle parts to be used for the repair, among others. Other examples are also possible.

Moreover, any data specifying the determined repair information and/or additional information may be associated with or may otherwise include an indication of the RO, so that a processor and/or a user of the system could determine that all of this information is part of the same RO. For example, the processor may add an indication of an RO ID to data specifying the determined repair information and/or additional information. Additionally or alternatively, the processor may create and store meta-data that associates an RO ID with data specifying the determined repair information and/or additional information. Other examples are also possible.

Yet further, as noted above, the processor may store in data storage a repair order's data specifying determined repair information and/or additional information. For example, FIG. 1 illustrates that automatically generated ROs 236 may be stored in data storage device 210 of VRD system 200 as part of repair orders 214. In another example, FIG. 3 illustrates that automatically generated ROs 316 may be stored in data storage 308 of the VRT 300. Other examples are also possible.

At block 610, method 600 involves directing, by the at least one processor, a display device to display at least one visual indication representative of the generated RO.

In accordance with the present disclosure, the at least one processor may be configured to cause a display device to display one or more visual indications that represent the generated RO. Also, the display device displaying these visual indications may be part of a computing system that includes the processor that generated the RO (e.g., a display device of VRT 300 (not shown)) and/or may be a display device of an external computing device that is separate from the computing system that includes the processor (e.g., a display device of a customer's mobile phone), among other options. As such, the displayed visual indication(s) may help provide visual information based on which a repair shop can then repair a particular vehicle, among other advantages.

To illustrate, refer again to FIG. 1 showing that the VRD system 102 may output visual indication 124 of an automatically generated RO. In particular, this visual indication 124 could be displayed as part of a GUI on a display of the VRD system. In another case, as shown in FIG. 3, VRT 300 displays visual indication 314 of an automatically generated RO (e.g., could be the same as visual indication 124) as part of the user interface 302. In this regard, the VRD system 102 could transmit the visual indication 124 to one or more of the VRTs 106-120 (and/or to other devices) such that a VRT could display this visual indication 124. Additionally, or alternatively, the VRT 300 could transmit the visual indication 314 to the VRD system 102 such that the VRD system 102 could display this visual indication 314. Other cases are also possible.

Moreover, the displayed visual indication could take on one of various forms. In one example, the visual indication may simply take the form of number(s), letter(s), and/or character(s) representative of the specified repair information and/or additional information, such as of a particular vehicle repair procedure and/or of a particular vehicle-symptom for instance. In another example, the visual indication may take the form of a chart providing a graphical representation of data, such as of obtained sensor data for instance. In yet another example, the visual indication may take the form of an infographic proving a visual representation of information, such as of visuals showing steps in a particular vehicle repair procedure. Other examples and combinations of the above examples are possible as well.

IV. Illustrative Automatic Generation of an RO

Figure 7A:
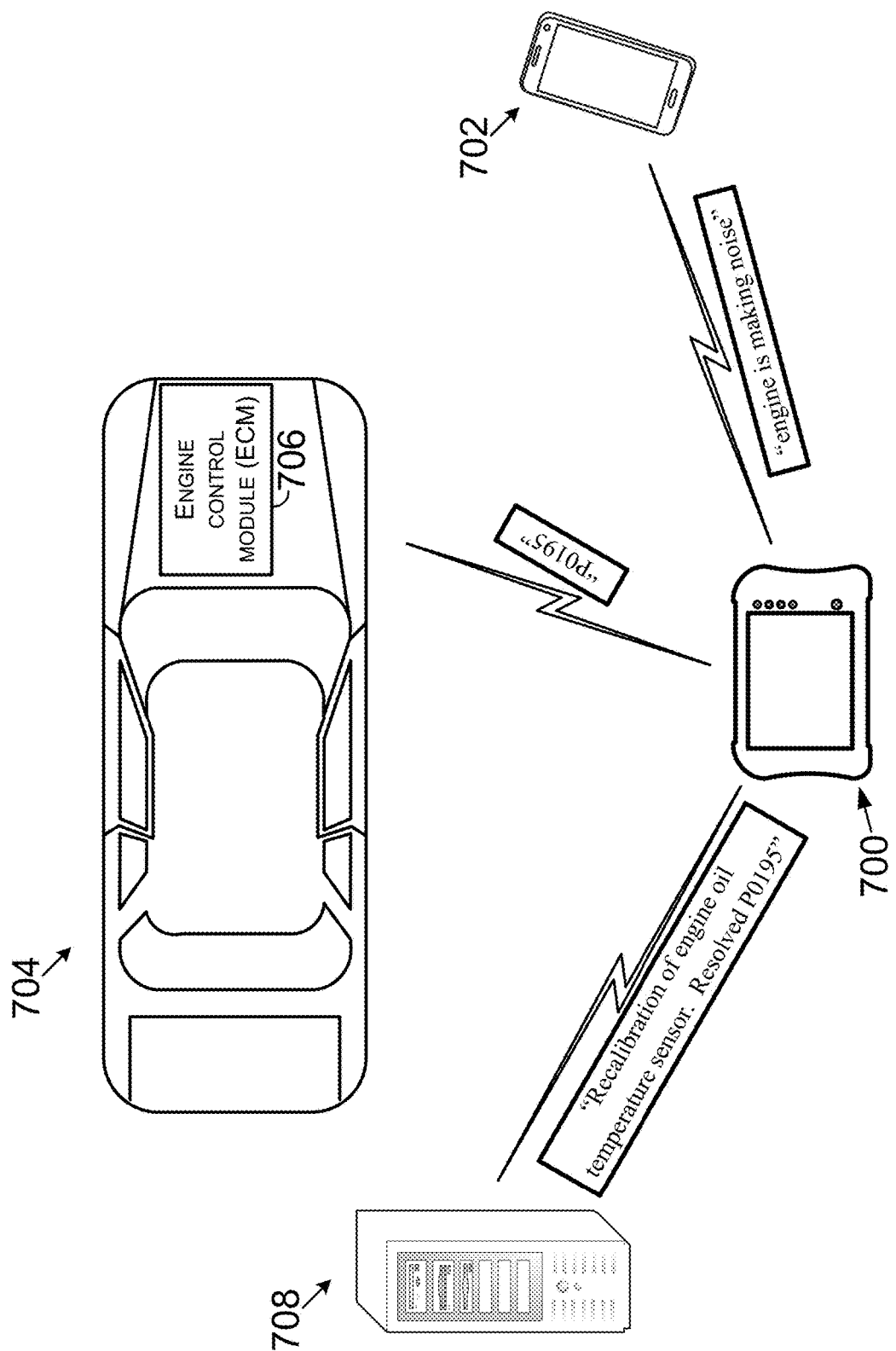
FIGS. 7A-7B illustrate automatic generation of a repair order in accordance with one or more example embodiments.
Figure 7B:
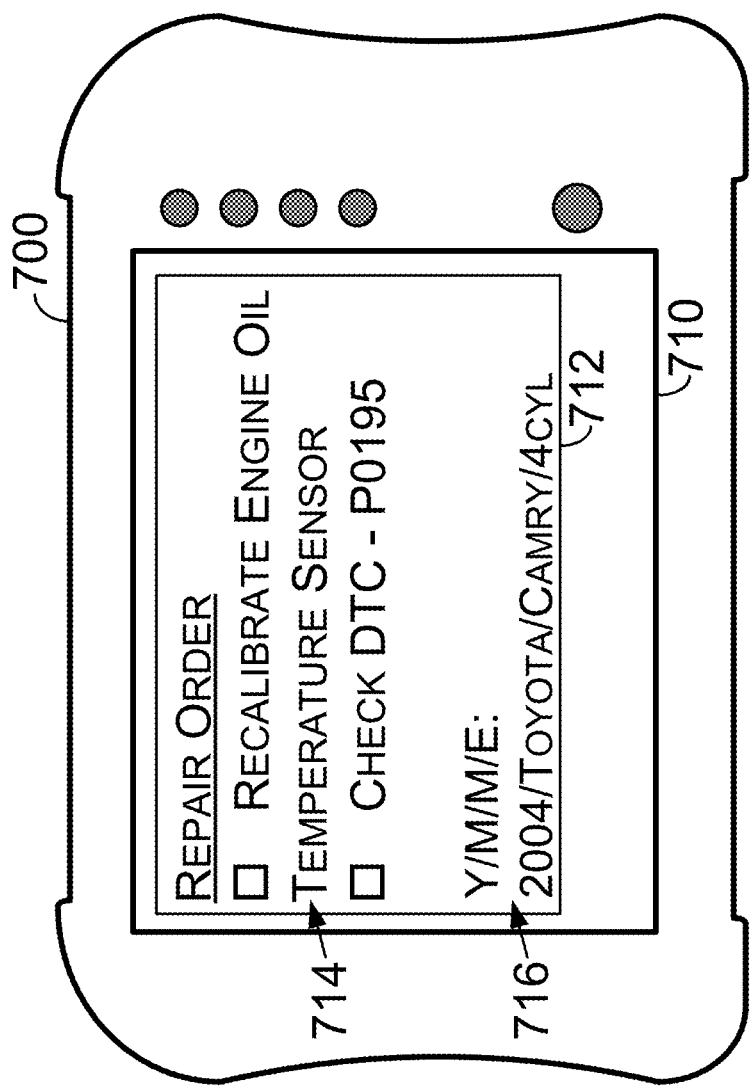

FIGS. 7A-7B next help illustrate the above-described approach for automatically generating an RO. It is noted that FIGS. 7A-7B are shown for exemplary purposes only and are not meant to be limiting.

As shown in FIG. 7A, a representative VRT 700 receives information, over a wireless communication link, from a representative mobile phone 702, which is owned by a customer that also owns a representative vehicle 704. In particular, the customer may vocally provide the information about the vehicle 704 via the mobile phone 702 and that information may be included speech data specifying the phrase "engine is making noise".

In this example, the VRT 700's processor may determine that the words "engine" and "noise" are found in the speech data and may use those words as basis for then responsively querying the vehicle 704's Engine Control Module (ECM) 706 for information about the vehicle 704's engine. As shown in FIG. 7A, the VRT 700 then receives information, over a wireless communication link, from the ECM 706 and that information indicates a DTC "P0195", which is representative of an engine oil temperature sensor malfunction as noted above.

Moreover, shown in FIG. 7A is a representative server 708 and that server 708 may include a data storage device containing a plurality of ROs each specifying historical repair data, which may include information related to one or more vehicle repairs previously carried out for the vehicle 704. With this arrangement, FIG. 7A shows that VRT 700 receives information (e.g., upon request), over a wireless communication link, from server 708 and that information indicates a historical repair to the vehicle 704. Specifically, the historical repair specifies a previous recalibration of the vehicle 704's engine oil temperature sensor and that such a repair helped resolve DTC "P0195".

Once the VRT 700 receives such data from the various entities shown in FIG. 7A, the VRT 700's processor may then use that data in combination to automatically generate an RO, in accordance with the present disclosure. In particular, based on vehicle-system data from the ECM indicating the DTC "P0195" and on other input data from server 708 indicating a recalibration of the vehicle 704's engine oil temperature sensor previously helping to resolve the DTC "P0195", the processor may determine that recalibration of the vehicle 704's engine oil temperature sensor as well as the DTC "P0195" are to be specified in an RO associated with the vehicle 704. Accordingly, the VRT 700's processor may then generate the RO including this repair information and perhaps also including additional information.

As shown in FIG. 7B, the VRT 700's display device 710 is displaying an automatically generated repair order 712 including repair information 714 as well as additional information 716. In particular, the repair information 714 is shown to include a recalibration of the engine oil temperature sensor as well as an indication of DTC "P0195" in accordance with the above-mentioned determination by the VRT 700's processor. Further, the additional information 716 is shown to include information about the vehicle 704, specifically the vehicle 704's Y/M/M/E.

V. Conclusion

Example embodiments have been described above. Those skilled in the art will understand that changes and modifications can be made to the described embodiments without departing from the true scope of the present invention, which is defined by the claims.

Additional embodiments, based on the features or functions described herein, can be embodied as a computer-readable medium storing program instructions, that when executed by a processor of a machine cause a set of functions to be performed, the set of functions comprising the features or functions of the aspects and embodiments described herein.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

Embodiments of the present disclosure may thus relate to one of the enumerated example embodiments (EEEs) listed below.

EEE 1 is a method comprising: receiving, by at least one processor from one or more electronic control units (ECUs) of a particular vehicle, vehicle-system data including information about a state of one or more vehicle-systems of the particular vehicle; receiving, by the at least one processer from one or more data sources other than the one or more ECUs, other input data indicative of a state of the particular vehicle; based on the vehicle-system data and on the other input data, determining, by the at least one processor, repair information to be specified in a repair order (RO) associated with the particular vehicle; generating, by the at least one processor, an RO specifying at least the determined repair information, wherein the generated RO is associated with the particular vehicle; and directing, by the at least one processor, a display device to display at least one visual indication representative of the generated RO.

EEE 2 is the method of EEE 1, wherein receiving other input data indicative of the state of the particular vehicle comprises one or more of: (i) receiving, from at least one computing device, textual data including a written description of the state of the particular vehicle, (ii) receiving, from at least one computing device, speech data including a spoken-language description of the state of the particular vehicle, and (iii) receiving, from a data storage device containing a plurality of computer-readable vehicle repair orders (ROs), historical repair data including information related to one or more vehicle repairs previously carried out for the particular vehicle.

EEE 3 is the method of EEE 1 or 2, further comprising: making a determination, by the at least one processer, that the received other input data is indicative of a particular vehicle-system of the particular vehicle; and in response to making the determination, transmitting, from the at least one processor to at least one ECU of the one or more ECUs, a request for information about a state of the particular vehicle-system, wherein receiving vehicle-system data comprises, in response to transmitting the request, receiving vehicle-system data including the requested information about the state of the particular vehicle-system.

EEE 4 is the method of EEE 3, further comprising: in response to making the determination, identifying, by the at least one processor, at least one ECU, from among the one or more ECUs, that is associated with the particular vehicle-system of the particular vehicle, wherein transmitting, to the at least one ECU, a request for information about a state of the particular vehicle-system comprises transmitting, to the identified at least one ECU that is associated with the particular vehicle-system, the request for information about the state of the particular vehicle-system.

EEE 5 is the method of EEE 3, wherein making the determination comprises making a determination that the received other input data is indicative of one or more of (i) a particular vehicle-symptom associated with the particular vehicle-system and (ii) a candidate vehicle repair procedure to resolve the particular vehicle-symptom associated with the particular vehicle-system, wherein transmitting a request for information about the state of the particular vehicle-system comprises transmitting a request for information related to one or more of the particular vehicle-symptom and the candidate vehicle repair procedure, and wherein receiving vehicle-system data including the requested information about the state of the particular vehicle-system comprises receiving vehicle-system data including the requested information related to one or more of the particular vehicle-symptom and the candidate vehicle repair procedure.

EEE 6 is the method of EEE 3, wherein determining, based on the vehicle-system data and on the other input data, repair information to be specified comprises determining, based on the received vehicle-system data including the requested information about the state of the particular vehicle-system and on the other input data, the repair information to be specified.

EEE 7 is the method of EEE 1 or 2, further comprising: making a determination, by the at least one processer, that the received other input data is indicative of a particular vehicle-system of the particular vehicle; and in response to making the determination, identifying, by the at least one processor, a portion of the received vehicle-system data that includes information about the state of the particular vehicle-system.

EEE 8 is the method of EEE 7, wherein making the determination comprises making a determination that the received other input data is indicative of one or more of (i) a particular vehicle-symptom associated with the particular vehicle-system and (ii) a candidate vehicle repair procedure to resolve the particular vehicle-symptom associated with the particular vehicle-system, and wherein identifying a portion of the received vehicle-system data that includes information about the state of the particular vehicle-system comprises identifying a portion of the received vehicle-system data that includes information related to one or more of the particular vehicle-symptom and the candidate vehicle repair procedure.

EEE 9 is the method of EEE 7, wherein determining, based on the vehicle-system data and on the other input data, repair information to be specified comprises determining, based on the identified portion and on the other input data, the repair information to be specified.

EEE 10 is the method of EEE 1 or 2, further comprising: making a determination, by the at least one processer, that the received vehicle-system data includes information about a state of a particular vehicle-system of the particular vehicle; and in response to making the determination, transmitting, from the at least one processor to at least data source of the one or more other data sources, a request for additional information about the state of the particular vehicle-system, wherein receiving other input data comprises, in response to transmitting the request, receiving other input data including the requested additional information about the state of the particular vehicle-system.

EEE 11 is the method of EEE 10, further comprising: in response to making the determination, identifying, by the at least one processor, at least one other data source, from among the one or more other data sources, that has the additional information about the state of the particular vehicle-system, wherein transmitting, to the at least one data source, a request for additional information comprises transmitting, to the identified at least one data source that has the additional information about the state of the particular vehicle-system, the request for the additional information about the state of the particular vehicle-system.

EEE 12 is the method of EEE 10, wherein making the determination comprises making a determination that the received vehicle-system data includes information about one or more of (i) a particular vehicle-symptom associated with the particular vehicle-system and (ii) a candidate vehicle repair procedure to resolve the particular vehicle-symptom associated with the particular vehicle-system, wherein transmitting a request for additional information about the state of the particular vehicle-system comprises transmitting a request for additional information related to one or more of the particular vehicle-symptom and the candidate vehicle repair procedure, and wherein receiving other input data including the requested additional information about the state of the particular vehicle-system comprises receiving other input data including the requested additional information related to one or more of the particular vehicle-symptom and the candidate vehicle repair procedure.

EEE 13 is the method of EEE 10, wherein determining, based on the vehicle-system data and on the other input data, repair information to be specified comprises determining, based on the vehicle-system data and on the other input data including the requested additional information about the state of the particular vehicle-system, the repair information to be specified.

EEE 14 is the method of EEE 1 or 2, further comprising: making a determination, by the at least one processer, that the received vehicle-system data includes information about a state of a particular vehicle-system of the particular vehicle; and in response to making the determination, identifying, by the at least one processor, a portion of the received other input data that includes additional information related to the state of the particular vehicle-system.

EEE 15 is the method of EEE 14, wherein making the determination comprises making a determination that the received vehicle system data includes information about one or more of (i) a particular vehicle-symptom associated with the particular vehicle-system and (ii) a candidate vehicle repair procedure to resolve the particular vehicle-symptom associated with the particular vehicle-system, and wherein identifying a portion of the received other input data that includes additional information related to the state of the particular vehicle-system comprises identifying a portion of the received other input data that includes additional information related to one or more of the particular vehicle-symptom and the candidate vehicle repair procedure.

EEE 16 is the method of EEE 14, wherein determining, based on the vehicle-system data and on the other input data, repair information to be specified comprises determining, based on the vehicle-system data and on the identified portion, the repair information to be specified.

EEE 17 is the method of any one of EEE 1 to 16, wherein determining the repair information to be specified comprises: determining that the vehicle-system data is indicative of a particular vehicle-symptom associated with the particular vehicle; determining that the other input data is indicative of the particular vehicle-symptom associated with the particular vehicle; and based on the vehicle-system data and the other input data both being indicative of the particular vehicle-symptom associated with the particular vehicle, determining that the particular vehicle-symptom is to be specified in the RO associated with the particular vehicle.

EEE 18 is the method of any one of EEE 1 to 16, wherein determining the repair information to be specified comprises: determining that the vehicle-system data is indicative of a particular vehicle-symptom associated with the particular vehicle; determining that the other input data is indicative of the particular vehicle-symptom associated with the particular vehicle; based on the vehicle-system data and the other input data both being indicative of the particular vehicle-symptom associated with the particular vehicle, determining a vehicle repair procedure that resolves the particular vehicle-symptom; and determining that the determined vehicle repair procedure is to be specified in the RO associated with the particular vehicle.

EEE 19 is the method of any one of EEE 1 to 16, wherein determining the repair information to be specified comprises: determining that the vehicle-system data is indicative of a first vehicle-symptom associated with the particular vehicle; based on the vehicle-system data being indicative of the first vehicle-symptom associated with the particular vehicle, determining that the first vehicle-symptom is to be specified in the RO associated with the particular vehicle; determining that the other input data is indicative of a second vehicle-symptom associated with the particular vehicle, wherein the second vehicle-symptom is different from the first vehicle-symptom; and based on the other input data being indicative of the second vehicle-symptom associated with the particular vehicle, determining that the second vehicle-symptom is to be specified in the RO associated with the particular vehicle.

EEE 20 is the method of any one of EEE 1 to 16, wherein determining the repair information to be specified comprises: determining that the vehicle-system data is indicative of a first vehicle-symptom associated with the particular vehicle; determining that the other input data is indicative of a second vehicle-symptom associated with the particular vehicle, wherein the second vehicle-symptom is different from the first vehicle-symptom; determining a vehicle repair procedure that resolves both the first and second vehicle-symptoms associated with the particular vehicle; and determining that the determined vehicle repair procedure is to be specified in the RO associated with the particular vehicle.

EEE 21 is the method of any one of EEE 1 to 16, wherein determining the repair information to be specified comprises: determining that the vehicle-system data is indicative of a candidate vehicle repair procedure to resolve a particular vehicle-symptom associated with the particular vehicle; determining that the other input data is indicative of the candidate vehicle repair procedure to resolve the particular vehicle-symptom associated with the particular vehicle; and based on the vehicle-system data and the other input data both being indicative of the candidate vehicle repair procedure to resolve the particular vehicle-symptom associated with the particular vehicle, determining that the candidate vehicle repair procedure is to be specified in the RO associated with the particular vehicle.

EEE 22 is the method of any one of EEE 1 to 16, wherein determining the repair information to be specified comprises: determining that the vehicle-system data is indicative of a candidate vehicle repair procedure to resolve a particular vehicle-symptom associated with the particular vehicle; determining that the other input data is indicative of the candidate vehicle repair procedure to resolve the particular vehicle-symptom associated with the particular vehicle; and based on the vehicle-system data and the other input data both being indicative of the candidate vehicle repair procedure to resolve the particular vehicle-symptom associated with the particular vehicle, determining that the particular vehicle-symptom is to be specified in the RO associated with the particular vehicle.

EEE 23 is the method of any one of EEE 1 to 16, wherein determining the repair information to be specified comprises: determining that the vehicle-system data is indicative of a first candidate vehicle repair procedure to resolve a first vehicle-symptom associated with the particular vehicle; based on the vehicle-system data being indicative of the first candidate vehicle repair procedure to resolve the first vehicle-symptom associated with the particular vehicle, determining that the first candidate vehicle repair procedure is to be specified in the RO associated with the particular vehicle; determining that the other input data is indicative of a second candidate vehicle repair procedure to resolve a second vehicle-symptom associated with the particular vehicle; and based on the other input data being indicative of the second candidate vehicle repair procedure to resolve the second vehicle-symptom associated with the particular vehicle, determining that the second candidate vehicle repair procedure is to be specified in the RO associated with the particular vehicle.

EEE 24 is the method of EEE 23, wherein the first vehicle-symptom is the same as the second vehicle-symptom.

EEE 25 is the method of EEE 23, wherein the first vehicle-symptom is different from the second vehicle-symptom.

EEE 26 is the method of any one of EEE 1 to 16, wherein determining the repair information to be specified comprises: determining that the vehicle-system data is indicative of a first candidate vehicle repair procedure to resolve a first vehicle-symptom associated with the particular vehicle; based on the vehicle-system data being indicative of the first candidate vehicle repair procedure to resolve the first vehicle-symptom associated with the particular vehicle, determining that the first vehicle-symptom is to be specified in the RO associated with the particular vehicle; determining that the other input data is indicative of a second candidate vehicle repair procedure to resolve a second vehicle-symptom associated with the particular vehicle, wherein the second vehicle-symptom is different from the first vehicle-symptom; and based on the other input data being indicative of the second candidate vehicle repair procedure to resolve the second vehicle-symptom associated with the particular vehicle, determining that the second vehicle-symptom is to be specified in the RO associated with the particular vehicle.

EEE 27 is the method of any one of EEE 1 to 16, wherein determining the repair information to be specified comprises: determining that the vehicle-system data is indicative of a first candidate vehicle repair procedure to resolve a particular vehicle-symptom associated with the particular vehicle; determining that the other input data is indicative of a second candidate vehicle repair procedure to resolve the particular vehicle-symptom associated with the particular vehicle; and based on the vehicle-system data being of the first candidate vehicle repair procedure to resolve the particular vehicle-symptom and on the other input data being indicative of the second candidate vehicle repair procedure to resolve the particular vehicle-symptom, determining that the particular vehicle-symptom is to be specified in the RO associated with the particular vehicle.

EEE 28 is the method of any one of EEE 1 to 16, wherein determining the repair information to be specified comprises: determining that the vehicle-system data is indicative of a particular vehicle-symptom associated with the particular vehicle; determining that the other input data is indicative of a candidate vehicle repair procedure to resolve the particular vehicle-symptom associated with the particular vehicle; and based on the vehicle-system data being indicative of the particular vehicle-symptom associated with the particular vehicle and on the other input data being indicative of the candidate vehicle repair procedure to resolve the particular vehicle-symptom associated with the particular vehicle, determining that the candidate vehicle repair procedure is to be specified in the RO associated with the particular vehicle.

EEE 29 is the method of any one of EEE 1 to 16, wherein determining the repair information to be specified comprises: determining that the vehicle-system data is indicative of a particular vehicle-symptom associated with the particular vehicle; determining that the other input data is indicative of a candidate vehicle repair procedure to resolve the particular vehicle-symptom associated with the particular vehicle; and based on the vehicle-system data being indicative of the particular vehicle-symptom associated with the particular vehicle and on the other input data being indicative of the candidate vehicle repair procedure to resolve the particular vehicle-symptom associated with the particular vehicle, determining that the particular vehicle-symptom is to be specified in the RO associated with the particular vehicle.

EEE 30 is the method of any one of EEE 1 to 16, wherein determining the repair information to be specified comprises: determining that the vehicle-system data is indicative of a candidate vehicle repair procedure to resolve a particular vehicle-symptom associated with the particular vehicle; determining that the other input data is indicative of the particular vehicle-symptom associated with the particular vehicle; and based on the vehicle-system data being indicative of the candidate vehicle repair procedure to resolve the particular vehicle-symptom associated with the particular vehicle and on the other input data being indicative of the particular vehicle-symptom associated with the particular vehicle, determining that the candidate vehicle repair procedure is to be specified in the RO associated with the particular vehicle.

EEE 31 is the method of any one of EEE 1 to 16, wherein determining the repair information to be specified comprises: determining that the vehicle-system data is indicative of a candidate vehicle repair procedure to resolve a particular vehicle-symptom associated with the particular vehicle; determining that the other input data is indicative of the particular vehicle-symptom associated with the particular vehicle; and based on the vehicle-system data being indicative of the candidate vehicle repair procedure to resolve the particular vehicle-symptom associated with the particular vehicle and on the other input data being indicative of the particular vehicle-symptom associated with the particular vehicle, determining that the particular vehicle-symptom is to be specified in the RO associated with the particular vehicle.

EEE 32 is a computing system comprising: at least one processor; a computer-readable medium; and program instruction stored on the computer-readable medium and executable by the at least one processor to: receive, from one or more electronic control units (ECUs) of a particular vehicle, vehicle-system data including information about a state of one or more vehicle-systems of the particular vehicle; receive, from one or more data sources other than the one or more ECUs, other input data indicative of a state of the particular vehicle; based on the vehicle-system data and on the other input data, determine repair information to be specified in a repair order (RO) associated with the particular vehicle; generate an RO specifying at least the determined repair information, wherein the generated RO is associated with the particular vehicle; and direct a display device to display at least one visual indication representative of the generated RO.

EEE 33 is the computing system of EEE 32, further comprising: a communication interface, wherein the program instruction being executable to receive the vehicle-system data comprises the program instruction being executable to receive the vehicle-system data from one or more ECUs of the particular vehicle via the communication interface, and wherein the program instruction being executable to receive the other input data comprises the program instruction being executable to receive the other input data from the one or more other data sources via the communication interface.

EEE 34 is the computing system of EEE 33, wherein the communication interface comprises one or more of (i) a wired communication interface operable to engage in wired transfer of data and (ii) a wireless communication interface operable to engage in wireless transfer of data.

EEE 35 is the computing system of any one of EEE 32 to 34, further comprising the display device.

EEE 36 is the computing system of any one of EEE 32 to 34, wherein the display device is of an external computing device that is separate from the computing system.

EEE 37 is the computing system of any one of EEE 32 to 36, wherein the program instruction being executable to receive other input data indicative of the state of the particular vehicle comprises one or more of: (i) the program instruction being executable to receive, from at least one computing device, textual data including a written description of the state of the particular vehicle, (ii) the program instruction being executable to receive, from at least one computing device, speech data including a spoken-language description of the state of the particular vehicle, and (iii) the program instruction being executable to receive, from a data storage device containing a plurality of computer-readable vehicle repair orders (ROs), historical repair data including information related to one or more vehicle repairs previously carried out for the particular vehicle.

EEE 38 is the computing system of any one of EEE 32 to 37, wherein the program instructions are further executable to: make a determination that the received other input data is indicative of a particular vehicle-system of the particular vehicle; and in response to making the determination, transmit, to at least one ECU of the one or more ECUs, a request for information about a state of the particular vehicle-system, wherein the program instructions being executable to receive vehicle-system data comprises the program instructions being executable to, in response to transmitting the request, receive vehicle-system data including the requested information about the state of the particular vehicle-system.

EEE 39 is the computing system of EEE 38, wherein the program instructions are further executable to: in response to making the determination, identify at least one ECU, from among the one or more ECUs, that is associated with the particular vehicle-system of the particular vehicle, wherein the program instructions being executable to transmit, to the at least one ECU, a request for information about a state of the particular vehicle-system comprises the program instructions being executable to transmit, to the identified at least one ECU that is associated with the particular vehicle-system, the request for information about the state of the particular vehicle-system.

EEE 40 is the computing system of EEE 38, wherein the program instructions being executable to make the determination comprises the program instructions being executable to make a determination that the received other input data is indicative of one or more of (i) a particular vehicle-symptom associated with the particular vehicle-system and (ii) a candidate vehicle repair procedure to resolve the particular vehicle-symptom associated with the particular vehicle-system, wherein the program instructions being executable to make transmit a request for information about the state of the particular vehicle-system comprises the program instructions being executable to make transmit a request for information related to one or more of the particular vehicle-symptom and the candidate vehicle repair procedure, and wherein the program instructions being executable to make receive vehicle-system data including the requested information about the state of the particular vehicle-system comprises the program instructions being executable to make receive vehicle-system data including the requested information related to one or more of the particular vehicle-symptom and the candidate vehicle repair procedure.

EEE 41 is the computing system of EEE 38, wherein the program instructions being executable to determine, based on the vehicle-system data and on the other input data, repair information to be specified comprises the program instructions being executable to determine, based on the received vehicle-system data including the requested information about the state of the particular vehicle-system and on the other input data, the repair information to be specified.

EEE 42 is the computing system of any one of EEE 32 to 37, wherein the program instructions are further executable to: make a determination that the received other input data is indicative of a particular vehicle-system of the particular vehicle; and in response to making the determination, identify a portion of the received vehicle-system data that includes information about the state of the particular vehicle-system.

EEE 43 is the computing system of EEE 42, wherein the program instructions being executable to make the determination comprises the program instructions being executable to make a determination that the received other input data is indicative of one or more of (i) a particular vehicle-symptom associated with the particular vehicle-system and (ii) a candidate vehicle repair procedure to resolve the particular vehicle-symptom associated with the particular vehicle-system, and wherein the program instructions being executable to identify a portion of the received vehicle-system data that includes information about the state of the particular vehicle-system comprises the program instructions being executable to identify a portion of the received vehicle-system data that includes information related to one or more of the particular vehicle-symptom and the candidate vehicle repair procedure.

EEE 44 is the computing system of EEE 42, wherein the program instructions being executable to determine, based on the vehicle-system data and on the other input data, repair information to be specified comprises the program instructions being executable to determine, based on the identified portion and on the other input data, the repair information to be specified.

EEE 45 is the computing system of any one of EEE 32 to 37, wherein the program instructions are further executable to: make a determination that the received vehicle-system data includes information about a state of a particular vehicle-system of the particular vehicle; and in response to making the determination, transmit, to at least data source of the one or more other data sources, a request for additional information about the state of the particular vehicle-system, wherein the program instruction being executable to receive other input data comprises the program instruction being executable to, in response to transmitting the request, receive other input data including the requested additional information about the state of the particular vehicle-system.

EEE 46 is the computing system of EEE 45, wherein the program instructions are further executable to: in response to making the determination, identify at least one other data source, from among the one or more other data sources, that has the additional information about the state of the particular vehicle-system, wherein the program instruction being executable to transmit, to the at least one data source, a request for additional information comprises the program instruction being executable to transmit, to the identified at least one data source that has the additional information about the state of the particular vehicle-system, the request for the additional information about the state of the particular vehicle-system.

EEE 47 is the computing system of EEE 45, wherein the program instruction being executable to make the determination comprises the program instruction being executable to make a determination that the received vehicle-system data includes information about one or more of (i) a particular vehicle-symptom associated with the particular vehicle-system and (ii) a candidate vehicle repair procedure to resolve the particular vehicle-symptom associated with the particular vehicle-system, wherein the program instruction being executable to transmit a request for additional information about the state of the particular vehicle-system comprises the program instruction being executable to transmit a request for additional information related to one or more of the particular vehicle-symptom and the candidate vehicle repair procedure, and wherein the program instruction being executable to receive other input data including the requested additional information about the state of the particular vehicle-system comprises the program instruction being executable to receive other input data including the requested additional information related to one or more of the particular vehicle-symptom and the candidate vehicle repair procedure.

EEE 48 is the computing system of EEE 45, wherein the program instruction being executable to determine, based on the vehicle-system data and on the other input data, repair information to be specified comprises the program instruction being executable to determine, based on the vehicle-system data and on the other input data including the requested additional information about the state of the particular vehicle-system, the repair information to be specified.

EEE 49 is the computing system of any one of EEE 32 to 37, wherein the program instructions are further executable to: make a determination that the received vehicle-system data includes information about a state of a particular vehicle-system of the particular vehicle; and in response to making the determination, identify a portion of the received other input data that includes additional information related to the state of the particular vehicle-system.

EEE 50 is the computing system of EEE 49, wherein the program instruction being executable to make the determination comprises the program instruction being executable to make a determination that the received vehicle system data includes information about one or more of (i) a particular vehicle-symptom associated with the particular vehicle-system and (ii) a candidate vehicle repair procedure to resolve the particular vehicle-symptom associated with the particular vehicle-system, and wherein the program instruction being executable to identify a portion of the received other input data that includes additional information related to the state of the particular vehicle-system comprises the program instruction being executable to identify a portion of the received other input data that includes additional information related to one or more of the particular vehicle-symptom and the candidate vehicle repair procedure.

EEE 51 is the computing system of EEE 49, wherein the program instruction being executable to determine, based on the vehicle-system data and on the other input data, repair information to be specified comprises the program instruction being executable to determine, based on the vehicle-system data and on the identified portion, the repair information to be specified.

EEE 52 is the computing system of any one of EEE 32 to 51, wherein the program instruction being executable to determine the repair information to be specified comprises the program instruction being executable to: determine that the vehicle-system data is indicative of a particular vehicle-symptom associated with the particular vehicle; determine that the other input data is indicative of the particular vehicle-symptom associated with the particular vehicle; and based on the vehicle-system data and the other input data both being indicative of the particular vehicle-symptom associated with the particular vehicle, determine that the particular vehicle-symptom is to be specified in the RO associated with the particular vehicle.

EEE 53 is the computing system of any one of EEE 32 to 51, wherein the program instruction being executable to determine the repair information to be specified comprises the program instruction being executable to: determine that the vehicle-system data is indicative of a particular vehicle-symptom associated with the particular vehicle; determine that the other input data is indicative of the particular vehicle-symptom associated with the particular vehicle; based on the vehicle-system data and the other input data both being indicative of the particular vehicle-symptom associated with the particular vehicle, determine a vehicle repair procedure that resolves the particular vehicle-symptom; and determine that the determined vehicle repair procedure is to be specified in the RO associated with the particular vehicle.

EEE 54 is the computing system of any one of EEE 32 to 51, wherein the program instruction being executable to determine the repair information to be specified comprises the program instruction being executable to: determine that the vehicle-system data is indicative of a first vehicle-symptom associated with the particular vehicle; based on the vehicle-system data being indicative of the first vehicle-symptom associated with the particular vehicle, determine that the first vehicle-symptom is to be specified in the RO associated with the particular vehicle; determine that the other input data is indicative of a second vehicle-symptom associated with the particular vehicle, wherein the second vehicle-symptom is different from the first vehicle-symptom; and based on the other input data being indicative of the second vehicle-symptom associated with the particular vehicle, determine that the second vehicle-symptom is to be specified in the RO associated with the particular vehicle.

EEE 55 is the computing system of any one of EEE 32 to 51, wherein the program instruction being executable to determine the repair information to be specified comprises the program instruction being executable to: determine that the vehicle-system data is indicative of a first vehicle-symptom associated with the particular vehicle; determine that the other input data is indicative of a second vehicle-symptom associated with the particular vehicle, wherein the second vehicle-symptom is different from the first vehicle-symptom; determine a vehicle repair procedure that resolves both the first and second vehicle-symptoms associated with the particular vehicle; and determine that the determined vehicle repair procedure is to be specified in the RO associated with the particular vehicle.

EEE 56 is the computing system of any one of EEE 32 to 51, wherein the program instruction being executable to determine the repair information to be specified comprises the program instruction being executable to: determine that the vehicle-system data is indicative of a candidate vehicle repair procedure to resolve a particular vehicle-symptom associated with the particular vehicle; determine that the other input data is indicative of the candidate vehicle repair procedure to resolve the particular vehicle-symptom associated with the particular vehicle; and based on the vehicle-system data and the other input data both being indicative of the candidate vehicle repair procedure to resolve the particular vehicle-symptom associated with the particular vehicle, determine that the candidate vehicle repair procedure is to be specified in the RO associated with the particular vehicle.

EEE 57 is the computing system of any one of EEE 32 to 51, wherein the program instruction being executable to determine the repair information to be specified comprises the program instruction being executable to: determine that the vehicle-system data is indicative of a candidate vehicle repair procedure to resolve a particular vehicle-symptom associated with the particular vehicle; determine that the other input data is indicative of the candidate vehicle repair procedure to resolve the particular vehicle-symptom associated with the particular vehicle; and based on the vehicle-system data and the other input data both being indicative of the candidate vehicle repair procedure to resolve the particular vehicle-symptom associated with the particular vehicle, determine that the particular vehicle-symptom is to be specified in the RO associated with the particular vehicle.

EEE 58 is the computing system of any one of EEE 32 to 51, wherein the program instruction being executable to determine the repair information to be specified comprises the program instruction being executable to: determine that the vehicle-system data is indicative of a first candidate vehicle repair procedure to resolve a first vehicle-symptom associated with the particular vehicle; based on the vehicle-system data being indicative of the first candidate vehicle repair procedure to resolve the first vehicle-symptom associated with the particular vehicle, determining that the first candidate vehicle repair procedure is to be specified in the RO associated with the particular vehicle; determine that the other input data is indicative of a second candidate vehicle repair procedure to resolve a second vehicle-symptom associated with the particular vehicle; and based on the other input data being indicative of the second candidate vehicle repair procedure to resolve the second vehicle-symptom associated with the particular vehicle, determine that the second candidate vehicle repair procedure is to be specified in the RO associated with the particular vehicle.

EEE 59 is the computing system of EEE 58, wherein the first vehicle-symptom is the same as the second vehicle-symptom.

EEE 60 is the computing system of EEE 58, wherein the first vehicle-symptom is different from the second vehicle-symptom.

EEE 61 is the computing system of any one of EEE 32 to 51, wherein the program instruction being executable to determine the repair information to be specified comprises the program instruction being executable to: determine that the vehicle-system data is indicative of a first candidate vehicle repair procedure to resolve a first vehicle-symptom associated with the particular vehicle; based on the vehicle-system data being indicative of the first candidate vehicle repair procedure to resolve the first vehicle-symptom associated with the particular vehicle, determine that the first vehicle-symptom is to be specified in the RO associated with the particular vehicle; determine that the other input data is indicative of a second candidate vehicle repair procedure to resolve a second vehicle-symptom associated with the particular vehicle, wherein the second vehicle-symptom is different from the first vehicle-symptom; and based on the other input data being indicative of the second candidate vehicle repair procedure to resolve the second vehicle-symptom associated with the particular vehicle, determine that the second vehicle-symptom is to be specified in the RO associated with the particular vehicle.

EEE 62 is the computing system of any one of EEE 32 to 51, wherein the program instruction being executable to determine the repair information to be specified comprises the program instruction being executable to: determine that the vehicle-system data is indicative of a first candidate vehicle repair procedure to resolve a particular vehicle-symptom associated with the particular vehicle; determine that the other input data is indicative of a second candidate vehicle repair procedure to resolve the particular vehicle-symptom associated with the particular vehicle; and based on the vehicle-system data being of the first candidate vehicle repair procedure to resolve the particular vehicle-symptom and on the other input data being indicative of the second candidate vehicle repair procedure to resolve the particular vehicle-symptom, determine that the particular vehicle-symptom is to be specified in the RO associated with the particular vehicle.

EEE 63 is the computing system of any one of EEE 32 to 51, wherein the program instruction being executable to determine the repair information to be specified comprises the program instruction being executable to: determine that the vehicle-system data is indicative of a particular vehicle-symptom associated with the particular vehicle; determine that the other input data is indicative of a candidate vehicle repair procedure to resolve the particular vehicle-symptom associated with the particular vehicle; and based on the vehicle-system data being indicative of the particular vehicle-symptom associated with the particular vehicle and on the other input data being indicative of the candidate vehicle repair procedure to resolve the particular vehicle-symptom associated with the particular vehicle, determine that the candidate vehicle repair procedure is to be specified in the RO associated with the particular vehicle.

EEE 64 is the computing system of any one of EEE 32 to 51, wherein the program instruction being executable to determine the repair information to be specified comprises the program instruction being executable to: determine that the vehicle-system data is indicative of a particular vehicle-symptom associated with the particular vehicle; determine that the other input data is indicative of a candidate vehicle repair procedure to resolve the particular vehicle-symptom associated with the particular vehicle; and based on the vehicle-system data being indicative of the particular vehicle-symptom associated with the particular vehicle and on the other input data being indicative of the candidate vehicle repair procedure to resolve the particular vehicle-symptom associated with the particular vehicle, determine that the particular vehicle-symptom is to be specified in the RO associated with the particular vehicle.

EEE 65 is the computing system of any one of EEE 32 to 51, wherein the program instruction being executable to determine the repair information to be specified comprises the program instruction being executable to: determine that the vehicle-system data is indicative of a candidate vehicle repair procedure to resolve a particular vehicle-symptom associated with the particular vehicle; determine that the other input data is indicative of the particular vehicle-symptom associated with the particular vehicle; and based on the vehicle-system data being indicative of the candidate vehicle repair procedure to resolve the particular vehicle-symptom associated with the particular vehicle and on the other input data being indicative of the particular vehicle-symptom associated with the particular vehicle, determine that the candidate vehicle repair procedure is to be specified in the RO associated with the particular vehicle.

EEE 66 is the computing system of any one of EEE 32 to 51, wherein the program instruction being executable to determine the repair information to be specified comprises the program instruction being executable to: determine that the vehicle-system data is indicative of a candidate vehicle repair procedure to resolve a particular vehicle-symptom associated with the particular vehicle; determine that the other input data is indicative of the particular vehicle-symptom associated with the particular vehicle; and based on the vehicle-system data being indicative of the candidate vehicle repair procedure to resolve the particular vehicle-symptom associated with the particular vehicle and on the other input data being indicative of the particular vehicle-symptom associated with the particular vehicle, determine that the particular vehicle-symptom is to be specified in the RO associated with the particular vehicle.

EEE 67 is a computer readable medium having stored thereon instructions executable by at least one processor to cause a computing system to perform functions comprising: receiving, from one or more electronic control units (ECUs) of a particular vehicle, vehicle-system data including information about a state of one or more vehicle-systems of the particular vehicle; receiving, from one or more data sources other than the one or more ECUs, other input data indicative of a state of the particular vehicle; based on the vehicle-system data and on the other input data, determining repair information to be specified in a repair order (RO) associated with the particular vehicle; generating an RO specifying at least the determined repair information, wherein the generated RO is associated with the particular vehicle; and directing a display device to display at least one visual indication representative of the generated RO.

EEE 68 is the computer readable medium of EEE 67, wherein receiving other input data indicative of the state of the particular vehicle comprises one or more of: (i) receiving, from at least one computing device, textual data including a written description of the state of the particular vehicle, (ii) receiving, from at least one computing device, speech data including a spoken-language description of the state of the particular vehicle, and (iii) receiving, from a data storage device containing a plurality of computer-readable vehicle repair orders (ROs), historical repair data including information related to one or more vehicle repairs previously carried out for the particular vehicle.

EEE 69 is the computer readable medium of EEE 67 or 68, the functions further comprising: making a determination that the received other input data is indicative of a particular vehicle-system of the particular vehicle; and in response to making the determination, transmitting, to at least one ECU of the one or more ECUs, a request for information about a state of the particular vehicle-system, wherein receiving vehicle-system data comprises, in response to transmitting the request, receiving vehicle-system data including the requested information about the state of the particular vehicle-system.

EEE 70 is the computer readable medium of EEE 69, the functions further comprising: in response to making the determination, identifying at least one ECU, from among the one or more ECUs, that is associated with the particular vehicle-system of the particular vehicle, wherein transmitting, to the at least one ECU, a request for information about a state of the particular vehicle-system comprises transmitting, to the identified at least one ECU that is associated with the particular vehicle-system, the request for information about the state of the particular vehicle-system.

EEE 71 is the computer readable medium of EEE 69, wherein making the determination comprises making a determination that the received other input data is indicative of one or more of (i) a particular vehicle-symptom associated with the particular vehicle-system and (ii) a candidate vehicle repair procedure to resolve the particular vehicle-symptom associated with the particular vehicle-system, wherein transmitting a request for information about the state of the particular vehicle-system comprises transmitting a request for information related to one or more of the particular vehicle-symptom and the candidate vehicle repair procedure, and wherein receiving vehicle-system data including the requested information about the state of the particular vehicle-system comprises receiving vehicle-system data including the requested information related to one or more of the particular vehicle-symptom and the candidate vehicle repair procedure.

EEE 72 is the computer readable medium of EEE 69, wherein determining, based on the vehicle-system data and on the other input data, repair information to be specified comprises determining, based on the received vehicle-system data including the requested information about the state of the particular vehicle-system and on the other input data, the repair information to be specified.

EEE 73 is the computer readable medium of EEE 67 or 68, the functions further comprising: making a determination that the received other input data is indicative of a particular vehicle-system of the particular vehicle; and in response to making the determination, identifying a portion of the received vehicle-system data that includes information about the state of the particular vehicle-system.

EEE 74 is the computer readable medium of EEE 73, wherein making the determination comprises making a determination that the received other input data is indicative of one or more of (i) a particular vehicle-symptom associated with the particular vehicle-system and (ii) a candidate vehicle repair procedure to resolve the particular vehicle-symptom associated with the particular vehicle-system, and wherein identifying a portion of the received vehicle-system data that includes information about the state of the particular vehicle-system comprises identifying a portion of the received vehicle-system data that includes information related to one or more of the particular vehicle-symptom and the candidate vehicle repair procedure.

EEE 75 is the computer readable medium of EEE 73, wherein determining, based on the vehicle-system data and on the other input data, repair information to be specified comprises determining, based on the identified portion and on the other input data, the repair information to be specified.

EEE 76 is the computer readable medium of EEE 67 or 68, the functions further comprising: making a determination that the received vehicle-system data includes information about a state of a particular vehicle-system of the particular vehicle; and in response to making the determination, transmitting, to at least data source of the one or more other data sources, a request for additional information about the state of the particular vehicle-system, wherein receiving other input data comprises, in response to transmitting the request, receiving other input data including the requested additional information about the state of the particular vehicle-system.

EEE 77 is the computer readable medium of EEE 76, the functions further comprising: in response to making the determination, identifying at least one other data source, from among the one or more other data sources, that has the additional information about the state of the particular vehicle-system, wherein transmitting, to the at least one data source, a request for additional information comprises transmitting, to the identified at least one data source that has the additional information about the state of the particular vehicle-system, the request for the additional information about the state of the particular vehicle-system.

EEE 78 is the computer readable medium of EEE 76, wherein making the determination comprises making a determination that the received vehicle-system data includes information about one or more of (i) a particular vehicle-symptom associated with the particular vehicle-system and (ii) a candidate vehicle repair procedure to resolve the particular vehicle-symptom associated with the particular vehicle-system, wherein transmitting a request for additional information about the state of the particular vehicle-system comprises transmitting a request for additional information related to one or more of the particular vehicle-symptom and the candidate vehicle repair procedure, and wherein receiving other input data including the requested additional information about the state of the particular vehicle-system comprises receiving other input data including the requested additional information related to one or more of the particular vehicle-symptom and the candidate vehicle repair procedure.

EEE 79 is the computer readable medium of EEE 76, wherein determining, based on the vehicle-system data and on the other input data, repair information to be specified comprises determining, based on the vehicle-system data and on the other input data including the requested additional information about the state of the particular vehicle-system, the repair information to be specified.

EEE 80 is the computer readable medium of EEE 67 or 68, the functions further comprising: making a determination that the received vehicle-system data includes information about a state of a particular vehicle-system of the particular vehicle; and in response to making the determination, identifying a portion of the received other input data that includes additional information related to the state of the particular vehicle-system.

EEE 81 is the computer readable medium of EEE 80, wherein making the determination comprises making a determination that the received vehicle system data includes information about one or more of (i) a particular vehicle-symptom associated with the particular vehicle-system and (ii) a candidate vehicle repair procedure to resolve the particular vehicle-symptom associated with the particular vehicle-system, and wherein identifying a portion of the received other input data that includes additional information related to the state of the particular vehicle-system comprises identifying a portion of the received other input data that includes additional information related to one or more of the particular vehicle-symptom and the candidate vehicle repair procedure.

EEE 82 is the computer readable medium of EEE 80, wherein determining, based on the vehicle-system data and on the other input data, repair information to be specified comprises determining, based on the vehicle-system data and on the identified portion, the repair information to be specified.

EEE 83 is the computer readable medium of any one of EEE 67 to 82, wherein determining the repair information to be specified comprises: determining that the vehicle-system data is indicative of a particular vehicle-symptom associated with the particular vehicle; determining that the other input data is indicative of the particular vehicle-symptom associated with the particular vehicle; and based on the vehicle-system data and the other input data both being indicative of the particular vehicle-symptom associated with the particular vehicle, determining that the particular vehicle-symptom is to be specified in the RO associated with the particular vehicle.

EEE 84 is the computer readable medium of any one of EEE 67 to 82, wherein determining the repair information to be specified comprises: determining that the vehicle-system data is indicative of a particular vehicle-symptom associated with the particular vehicle; determining that the other input data is indicative of the particular vehicle-symptom associated with the particular vehicle; based on the vehicle-system data and the other input data both being indicative of the particular vehicle-symptom associated with the particular vehicle, determining a vehicle repair procedure that resolves the particular vehicle-symptom; and determining that the determined vehicle repair procedure is to be specified in the RO associated with the particular vehicle.

EEE 85 is the computer readable medium of any one of EEE 67 to 82, wherein determining the repair information to be specified comprises: determining that the vehicle-system data is indicative of a first vehicle-symptom associated with the particular vehicle; based on the vehicle-system data being indicative of the first vehicle-symptom associated with the particular vehicle, determining that the first vehicle-symptom is to be specified in the RO associated with the particular vehicle; determining that the other input data is indicative of a second vehicle-symptom associated with the particular vehicle, wherein the second vehicle-symptom is different from the first vehicle-symptom; and based on the other input data being indicative of the second vehicle-symptom associated with the particular vehicle, determining that the second vehicle-symptom is to be specified in the RO associated with the particular vehicle.

EEE 86 is the computer readable medium of any one of EEE 67 to 82, wherein determining the repair information to be specified comprises: determining that the vehicle-system data is indicative of a first vehicle-symptom associated with the particular vehicle; determining that the other input data is indicative of a second vehicle-symptom associated with the particular vehicle, wherein the second vehicle-symptom is different from the first vehicle-symptom; determining a vehicle repair procedure that resolves both the first and second vehicle-symptoms associated with the particular vehicle; and determining that the determined vehicle repair procedure is to be specified in the RO associated with the particular vehicle.

EEE 87 is the computer readable medium of any one of EEE 67 to 82, wherein determining the repair information to be specified comprises: determining that the vehicle-system data is indicative of a candidate vehicle repair procedure to resolve a particular vehicle-symptom associated with the particular vehicle; determining that the other input data is indicative of the candidate vehicle repair procedure to resolve the particular vehicle-symptom associated with the particular vehicle; and based on the vehicle-system data and the other input data both being indicative of the candidate vehicle repair procedure to resolve the particular vehicle-symptom associated with the particular vehicle, determining that the candidate vehicle repair procedure is to be specified in the RO associated with the particular vehicle.

EEE 88 is the computer readable medium of any one of EEE 67 to 82, wherein determining the repair information to be specified comprises: determining that the vehicle-system data is indicative of a candidate vehicle repair procedure to resolve a particular vehicle-symptom associated with the particular vehicle; determining that the other input data is indicative of the candidate vehicle repair procedure to resolve the particular vehicle-symptom associated with the particular vehicle; and based on the vehicle-system data and the other input data both being indicative of the candidate vehicle repair procedure to resolve the particular vehicle-symptom associated with the particular vehicle, determining that the particular vehicle-symptom is to be specified in the RO associated with the particular vehicle.

EEE 89 is the computer readable medium of any one of EEE 67 to 82, wherein determining the repair information to be specified comprises: determining that the vehicle-system data is indicative of a first candidate vehicle repair procedure to resolve a first vehicle-symptom associated with the particular vehicle; based on the vehicle-system data being indicative of the first candidate vehicle repair procedure to resolve the first vehicle-symptom associated with the particular vehicle, determining that the first candidate vehicle repair procedure is to be specified in the RO associated with the particular vehicle; determining that the other input data is indicative of a second candidate vehicle repair procedure to resolve a second vehicle-symptom associated with the particular vehicle; and based on the other input data being indicative of the second candidate vehicle repair procedure to resolve the second vehicle-symptom associated with the particular vehicle, determining that the second candidate vehicle repair procedure is to be specified in the RO associated with the particular vehicle.

EEE 90 is the computer readable medium of EEE 89, wherein the first vehicle-symptom is the same as the second vehicle-symptom.

EEE 91 is the computer readable medium of EEE 89, wherein the first vehicle-symptom is different from the second vehicle-symptom.

EEE 92 is the computer readable medium of any one of EEE 67 to 82, wherein determining the repair information to be specified comprises: determining that the vehicle-system data is indicative of a first candidate vehicle repair procedure to resolve a first vehicle-symptom associated with the particular vehicle; based on the vehicle-system data being indicative of the first candidate vehicle repair procedure to resolve the first vehicle-symptom associated with the particular vehicle, determining that the first vehicle-symptom is to be specified in the RO associated with the particular vehicle; determining that the other input data is indicative of a second candidate vehicle repair procedure to resolve a second vehicle-symptom associated with the particular vehicle, wherein the second vehicle-symptom is different from the first vehicle-symptom; and based on the other input data being indicative of the second candidate vehicle repair procedure to resolve the second vehicle-symptom associated with the particular vehicle, determining that the second vehicle-symptom is to be specified in the RO associated with the particular vehicle.

EEE 93 is the computer readable medium of any one of EEE 67 to 82, wherein determining the repair information to be specified comprises: determining that the vehicle-system data is indicative of a first candidate vehicle repair procedure to resolve a particular vehicle-symptom associated with the particular vehicle; determining that the other input data is indicative of a second candidate vehicle repair procedure to resolve the particular vehicle-symptom associated with the particular vehicle; and based on the vehicle-system data being of the first candidate vehicle repair procedure to resolve the particular vehicle-symptom and on the other input data being indicative of the second candidate vehicle repair procedure to resolve the particular vehicle-symptom, determining that the particular vehicle-symptom is to be specified in the RO associated with the particular vehicle.

EEE 94 is the computer readable medium of any one of EEE 67 to 82, wherein determining the repair information to be specified comprises: determining that the vehicle-system data is indicative of a particular vehicle-symptom associated with the particular vehicle; determining that the other input data is indicative of a candidate vehicle repair procedure to resolve the particular vehicle-symptom associated with the particular vehicle; and based on the vehicle-system data being indicative of the particular vehicle-symptom associated with the particular vehicle and on the other input data being indicative of the candidate vehicle repair procedure to resolve the particular vehicle-symptom associated with the particular vehicle, determining that the candidate vehicle repair procedure is to be specified in the RO associated with the particular vehicle.

EEE 95 is the computer readable medium of any one of EEE 67 to 82, wherein determining the repair information to be specified comprises: determining that the vehicle-system data is indicative of a particular vehicle-symptom associated with the particular vehicle; determining that the other input data is indicative of a candidate vehicle repair procedure to resolve the particular vehicle-symptom associated with the particular vehicle; and based on the vehicle-system data being indicative of the particular vehicle-symptom associated with the particular vehicle and on the other input data being indicative of the candidate vehicle repair procedure to resolve the particular vehicle-symptom associated with the particular vehicle, determining that the particular vehicle-symptom is to be specified in the RO associated with the particular vehicle.

EEE 96 is the computer readable medium of any one of EEE 67 to 82, wherein determining the repair information to be specified comprises: determining that the vehicle-system data is indicative of a candidate vehicle repair procedure to resolve a particular vehicle-symptom associated with the particular vehicle; determining that the other input data is indicative of the particular vehicle-symptom associated with the particular vehicle; and based on the vehicle-system data being indicative of the candidate vehicle repair procedure to resolve the particular vehicle-symptom associated with the particular vehicle and on the other input data being indicative of the particular vehicle-symptom associated with the particular vehicle, determining that the candidate vehicle repair procedure is to be specified in the RO associated with the particular vehicle.

EEE 97 is the computer readable medium of any one of EEE 67 to 82, wherein determining the repair information to be specified comprises: determining that the vehicle-system data is indicative of a candidate vehicle repair procedure to resolve a particular vehicle-symptom associated with the particular vehicle; determining that the other input data is indicative of the particular vehicle-symptom associated with the particular vehicle; and based on the vehicle-system data being indicative of the candidate vehicle repair procedure to resolve the particular vehicle-symptom associated with the particular vehicle and on the other input data being indicative of the particular vehicle-symptom associated with the particular vehicle, determining that the particular vehicle-symptom is to be specified in the RO associated with the particular vehicle.

We claim:

1. A method comprising:
   receiving, by one or more processors of a vehicle repair tool, vehicle-system data, wherein:
     the vehicle-system data includes information about a state of one or more vehicle-systems of a particular vehicle,
     receiving the vehicle-system data includes:
       receiving, by the one or more processors from a capture device, an image including text indicative of the state of one or more vehicle-systems of the particular vehicle, wherein receiving the image including text indicative of the state of one or more vehicle-systems of the particular vehicle includes the capture device capturing an image of a display device of the vehicle while the display device is displaying the text indicative of the state of one or more vehicle-systems of the particular vehicle as output by an electronic control unit of the vehicle,
       identifying, by the one or more processors performing optical character recognition to the image, the text indicative of the state of one or more vehicle-systems of the particular vehicle,
       determining, by the one or more processors, one or more electronic control units (ECUs) of the particular vehicle based on the identified text,
       transmitting, by a communication interface of the vehicle repair tool to the one or more ECUs of the particular vehicle based on the identified text, one or more requests for the vehicle-system data, wherein the communication interface includes one or more antennas configured to transmit and receive wireless communications, and/or one or more communication ports connectable to a wired communication link, and
       receiving, by the communication interface of the vehicle repair tool from the one or more ECUs of the particular vehicle, the vehicle-system data;

the vehicle-system data indicates at least one of a diagnostic trouble code (DTC) or sensor data detected from a particular vehicle-system of the particular vehicle, and a data storage of the vehicle repair tool has stored therein (i) data representative of a plurality of candidate vehicle repair procedures and (ii) data that maps at least one of diagnostic trouble codes or sensor data to candidate vehicle repair procedures of the plurality of candidate vehicle repair procedures;

using, by the one or more processors, the vehicle-system data and the data within the data storage of the vehicle repair tool that maps at least one of diagnostic trouble codes or sensor data to candidate vehicle repair procedures, to determine a particular candidate vehicle repair procedure that maps to at least one of the DTC or sensor data indicated by the vehicle-system data;

subsequent to and in response to determining the particular candidate vehicle repair procedure, transmitting, from the one or more processors via the communication interface to a remote server, a second wired or wireless transfer of data, wherein the second wired or wireless transfer of data includes a request for information about whether the particular candidate vehicle repair procedure has been performed on the particular vehicle, wherein the request for information includes data indicative of the particular candidate repair procedure;

receiving, by the one or more processors via the communication interface from the remote server in response to the request for information, a third wired or wireless transfer of data, wherein the third wired or wireless transfer of data includes other input data indicative of a state of the particular vehicle, wherein the other input data indicates whether the particular vehicle has undergone the particular candidate vehicle repair procedure;

determining, by the one or more processors, repair information to be specified in a repair order (RO) associated with the particular vehicle, wherein the repair information includes at least a portion of the vehicle-system data, an indication of the particular candidate vehicle repair procedure that maps to at least one of the DTC or sensor data indicated by the vehicle-system data, and an indication of whether the particular candidate vehicle repair procedure has been performed on the particular vehicle determined from the third wired or wireless transfer of data;

generating, by the one or more processors, an RO specifying at least the determined repair information, wherein the generated RO is associated with the particular vehicle; and directing, by the one or more processors, a display device of the vehicle repair tool to display at least one visual indication representative of the RO specifying at least the determined repair information.

2. The method of claim 1, wherein receiving other input data indicative of the state of the particular vehicle comprises one or more of: (i) receiving, from at least one computing device, textual data including a written description of the state of the particular vehicle, (ii) receiving, from at least one computing device, speech data including a spoken-language description of the state of the particular vehicle, or (iii) receiving, from a data storage device containing a plurality of computer-readable vehicle repair orders (ROs), historical repair data including information related to one or more vehicle repairs previously carried out for the particular vehicle.

3. The method of claim 1, wherein the other input data indicates that the particular vehicle has not undergone the particular candidate vehicle repair procedure, and wherein determining that the particular candidate vehicle repair procedure is to be specified in the RO associated with the particular vehicle comprises determining that the particular vehicle has not undergone the particular candidate vehicle repair procedure.

4. The method of claim 1, wherein the other input data indicates that the particular vehicle has undergone the particular candidate vehicle repair procedure, wherein the other input data additionally indicates that the particular vehicle having undergone the particular candidate vehicle repair procedure resulted in a change in the at least one of a diagnostic trouble code (DTC) or sensor data detected from a particular vehicle-system of the particular vehicle indicated by the vehicle-system data, and wherein determining that the particular candidate vehicle repair procedure is to be specified in the RO associated with the particular vehicle comprises determining that the particular vehicle has undergone the particular candidate vehicle repair procedure and that the particular vehicle having undergone the particular candidate vehicle repair procedure resulted in a change in the at least one of a diagnostic trouble code (DTC) or sensor data detected from a particular vehicle-system of the particular vehicle indicated by the vehicle-system data.

5. The method of claim 1, wherein determining a particular candidate vehicle repair procedure comprises determining, using mapping data in the data storage of the vehicle repair tool, that the DTC of the vehicle-system data maps to the particular candidate vehicle repair procedure.

6. The method of claim 1, wherein determining a particular candidate vehicle repair procedure comprises determining, using mapping data in the data storage of the vehicle repair tool, that a value of the detected sensor data of the vehicle-system data maps to the particular candidate vehicle repair procedure.

7. The method of claim 1, further comprising:
making a determination, by the one or more processors, that the received other input data is indicative of a particular vehicle-system of the particular vehicle; and
in response to making the determination, identifying, by the one or more processors, a portion of the received vehicle-system data that includes information about the state of the particular vehicle-system.

8. The method of claim 7,
wherein making the determination comprises making a determination that the received other input data is indicative of one or more of (i) a particular vehicle-symptom associated with the particular vehicle-system or (ii) a candidate vehicle repair procedure to resolve the particular vehicle-symptom associated with the particular vehicle-system, and
wherein identifying a portion of the received vehicle-system data that includes information about the state of the particular vehicle-system comprises identifying a portion of the received vehicle-system data that includes information related to one or more of the particular vehicle-symptom or the candidate vehicle repair procedure.

9. The method of claim 7, wherein determining, based on the vehicle-system data and on the other input data, repair information to be specified comprises determining, based on the identified portion and on the other input data, the repair information to be specified.

10. The method of claim 1, further comprising:
making a determination, by the one or more processors, that the received vehicle-system data includes information about a state of a particular vehicle-system of the particular vehicle; and
in response to making the determination, transmitting, from the one or more processors to the remote server, a request for additional information about the state of the particular vehicle-system,
wherein receiving other input data comprises, in response to transmitting the request, receiving other input data including the requested additional information about the state of the particular vehicle-system.

11. The method of claim 10,
wherein making the determination comprises making a determination that the received vehicle-system data includes information about one or more of (i) a particular vehicle-symptom associated with the particular vehicle-system or (ii) a candidate vehicle repair procedure to resolve the particular vehicle-symptom associated with the particular vehicle-system,
wherein transmitting a request for additional information about the state of the particular vehicle-system comprises transmitting a request for additional information related to one or more of the particular vehicle-symptom or the candidate vehicle repair procedure, and
wherein receiving other input data including the requested additional information about the state of the particular vehicle-system comprises receiving other input data including the requested additional information related to one or more of the particular vehicle-symptom or the candidate vehicle repair procedure.

12. The method of claim 10, wherein determining, based on the vehicle-system data and on the other input data, repair information to be specified comprises determining, based on the vehicle-system data and on the other input data including the requested additional information about the state of the particular vehicle-system, the repair information to be specified.

13. The method of claim 1, further comprising:
making a determination, by the one or more processors, that the received vehicle-system data includes information about a state of a particular vehicle-system of the particular vehicle; and
in response to making the determination, identifying, by the one or more processors, a portion of the received other input data that includes additional information related to the state of the particular vehicle-system.

14. The method of claim 13,
wherein making the determination comprises making a determination that the received vehicle-system data includes information about one or more of (i) a particular vehicle-symptom associated with the particular vehicle-system or (ii) a candidate vehicle repair procedure to resolve the particular vehicle-symptom associated with the particular vehicle-system, and
wherein identifying a portion of the received other input data that includes additional information related to the state of the particular vehicle-system comprises identifying a portion of the received other input data that includes additional information related to one or more of the particular vehicle-symptom or the candidate vehicle repair procedure.

15. The method of claim 13, wherein determining, based on the vehicle-system data and on the other input data, repair information to be specified comprises determining, based on the vehicle-system data and on the identified portion, the repair information to be specified.

16. The method of claim 1, wherein determining the repair information to be specified comprises:
determining that the vehicle-system data is indicative of a particular vehicle-symptom associated with the particular vehicle;
determining that the other input data is indicative of the particular vehicle-symptom associated with the particular vehicle; and
based on the vehicle-system data and the other input data both being indicative of the particular vehicle-symptom associated with the particular vehicle, determining that the particular vehicle-symptom is to be specified in the RO associated with the particular vehicle.

17. The method of claim 1, wherein determining the repair information to be specified comprises:
determining that the vehicle-system data is indicative of a particular vehicle-symptom associated with the particular vehicle;
determining that the other input data is indicative of the particular vehicle-symptom associated with the particular vehicle;
based on the vehicle-system data and the other input data both being indicative of the particular vehicle-symptom associated with the particular vehicle, determining a vehicle repair procedure that resolves the particular vehicle-symptom; and
determining that the determined vehicle repair procedure is to be specified in the RO associated with the particular vehicle.

18. The method of claim 1, wherein determining the repair information to be specified comprises:
determining that the vehicle-system data is indicative of a first vehicle-symptom associated with the particular vehicle;
based on the vehicle-system data being indicative of the first vehicle-symptom associated with the particular vehicle, determining that the first vehicle-symptom is to be specified in the RO associated with the particular vehicle;
determining that the other input data is indicative of a second vehicle-symptom associated with the particular vehicle, wherein the second vehicle-symptom is different from the first vehicle-symptom; and
based on the other input data being indicative of the second vehicle-symptom associated with the particular vehicle, determining that the second vehicle-symptom is to be specified in the RO associated with the particular vehicle.

19. The method of claim 1, wherein determining the repair information to be specified comprises:
determining that the vehicle-system data is indicative of a first vehicle-symptom associated with the particular vehicle;
determining that the other input data is indicative of a second vehicle-symptom associated with the particular vehicle, wherein the second vehicle-symptom is different from the first vehicle-symptom;
determining a vehicle repair procedure that resolves both the first and second vehicle-symptoms associated with the particular vehicle; and
determining that the determined vehicle repair procedure is to be specified in the RO associated with the particular vehicle.

20. The method of claim 1, wherein determining the repair information to be specified comprises:

determining that the vehicle-system data is indicative of a candidate vehicle repair procedure to resolve a particular vehicle-symptom associated with the particular vehicle;

determining that the other input data is indicative of the candidate vehicle repair procedure to resolve the particular vehicle-symptom associated with the particular vehicle; and based on the vehicle-system data and the other input data both being indicative of the candidate vehicle repair procedure to resolve the particular vehicle-symptom associated with the particular vehicle, determining that the candidate vehicle repair procedure is to be specified in the RO associated with the particular vehicle.

21. The method of claim 1, wherein determining the repair information to be specified comprises:

determining that the vehicle-system data is indicative of a candidate vehicle repair procedure to resolve a particular vehicle-symptom associated with the particular vehicle;

determining that the other input data is indicative of the candidate vehicle repair procedure to resolve the particular vehicle-symptom associated with the particular vehicle; and based on the vehicle-system data and the other input data both being indicative of the candidate vehicle repair procedure to resolve the particular vehicle-symptom associated with the particular vehicle, determining that the particular vehicle-symptom is to be specified in the RO associated with the particular vehicle.

22. The method of claim 1, wherein determining the repair information to be specified comprises:

determining that the vehicle-system data is indicative of a first candidate vehicle repair procedure to resolve a first vehicle-symptom associated with the particular vehicle;

based on the vehicle-system data being indicative of the first candidate vehicle repair procedure to resolve the first vehicle-symptom associated with the particular vehicle, determining that the first candidate vehicle repair procedure is to be specified in the RO associated with the particular vehicle;

determining that the other input data is indicative of a second candidate vehicle repair procedure to resolve a second vehicle-symptom associated with the particular vehicle; and based on the other input data being indicative of the second candidate vehicle repair procedure to resolve the second vehicle-symptom associated with the particular vehicle, determining that the second candidate vehicle repair procedure is to be specified in the RO associated with the particular vehicle.

23. The method of claim 22, wherein the first vehicle-symptom is the same as the second vehicle-symptom.

24. The method of claim 22, wherein the first vehicle-symptom is different from the second vehicle-symptom.

25. The method of claim 1, wherein determining the repair information to be specified comprises:

determining that the vehicle-system data is indicative of a first candidate vehicle repair procedure to resolve a first vehicle-symptom associated with the particular vehicle;

based on the vehicle-system data being indicative of the first candidate vehicle repair procedure to resolve the first vehicle-symptom associated with the particular vehicle, determining that the first vehicle-symptom is to be specified in the RO associated with the particular vehicle;

determining that the other input data is indicative of a second candidate vehicle repair procedure to resolve a second vehicle-symptom associated with the particular vehicle, wherein the second vehicle-symptom is different from the first vehicle-symptom; and based on the other input data being indicative of the second candidate vehicle repair procedure to resolve the second vehicle-symptom associated with the particular vehicle, determining that the second vehicle-symptom is to be specified in the RO associated with the particular vehicle.

26. The method of claim 1, wherein determining the repair information to be specified comprises:

determining that the vehicle-system data is indicative of a first candidate vehicle repair procedure to resolve a particular vehicle-symptom associated with the particular vehicle;

determining that the other input data is indicative of a second candidate vehicle repair procedure to resolve the particular vehicle-symptom associated with the particular vehicle; and based on the vehicle-system data being indicative of the first candidate vehicle repair procedure to resolve the particular vehicle-symptom and on the other input data being indicative of the second candidate vehicle repair procedure to resolve the particular vehicle-symptom, determining that the particular vehicle-symptom is to be specified in the RO associated with the particular vehicle.

27. The method of claim 1, wherein determining the repair information to be specified comprises:

determining that the vehicle-system data is indicative of a particular vehicle-symptom associated with the particular vehicle;

determining that the other input data is indicative of a candidate vehicle repair procedure to resolve the particular vehicle-symptom associated with the particular vehicle; and based on the vehicle-system data being indicative of the particular vehicle-symptom associated with the particular vehicle and on the other input data being indicative of the candidate vehicle repair procedure to resolve the particular vehicle-symptom associated with the particular vehicle, determining that the candidate vehicle repair procedure is to be specified in the RO associated with the particular vehicle.

28. The method of claim 1, wherein determining the repair information to be specified comprises:

determining that the vehicle-system data is indicative of a particular vehicle-symptom associated with the particular vehicle;

determining that the other input data is indicative of a candidate vehicle repair procedure to resolve the particular vehicle-symptom associated with the particular vehicle; and based on the vehicle-system data being indicative of the particular vehicle-symptom associated with the particular vehicle and on the other input data being indicative of the candidate vehicle repair procedure to resolve the particular vehicle-symptom associated with the particular vehicle, determining that the particular vehicle-symptom is to be specified in the RO associated with the particular vehicle.

29. The method of claim 1, wherein determining the repair information to be specified comprises:
- determining that the vehicle-system data is indicative of a candidate vehicle repair procedure to resolve a particular vehicle-symptom associated with the particular vehicle;
- determining that the other input data is indicative of the particular vehicle-symptom associated with the particular vehicle; and
- based on the vehicle-system data being indicative of the candidate vehicle repair procedure to resolve the particular vehicle-symptom associated with the particular vehicle and on the other input data being indicative of the particular vehicle-symptom associated with the particular vehicle, determining that the candidate vehicle repair procedure is to be specified in the RO associated with the particular vehicle.

30. The method of claim 1, wherein determining the repair information to be specified comprises:
- determining that the vehicle-system data is indicative of a candidate vehicle repair procedure to resolve a particular vehicle-symptom associated with the particular vehicle;
- determining that the other input data is indicative of the particular vehicle-symptom associated with the particular vehicle; and
- based on the vehicle-system data being indicative of the candidate vehicle repair procedure to resolve the particular vehicle-symptom associated with the particular vehicle and on the other input data being indicative of the particular vehicle-symptom associated with the particular vehicle, determining that the particular vehicle-symptom is to be specified in the RO associated with the particular vehicle.

31. A vehicle repair tool comprising:
- one or more processors;
- a communication interface including one or more from among: (i) one or more antennas configured to transmit and receive wireless communications, or (ii) one or more communication ports connectable to a wired communication link;
- a non-transitory computer-readable medium having stored thereon (i) data representative of a plurality of candidate vehicle repair procedures and (ii) data that maps at least one of diagnostic trouble codes or sensor data to candidate vehicle repair procedures of the plurality of candidate vehicle repair procedures; and
- program instructions stored on the non-transitory computer-readable medium and executable by the one or more processors to perform operations comprising:
  - receiving vehicle-system data, wherein:
    - the vehicle-system data includes information about a state of one or more vehicle-systems of a particular vehicle,
    - receiving the vehicle-system data includes;
      - receiving, by the one or more processors from a capture device, an image including text indicative of the state of one or more vehicle-systems of the particular vehicle, wherein receiving the image including text indicative of the state of one or more vehicle-systems of the particular vehicle includes the capture device capturing an image of a display device of the vehicle while the display device is displaying the text indicative of the state of one or more vehicle-systems of the particular vehicle as output by an electronic control unit of the vehicle,
      - identifying, by the one or more processors performing optical character recognition to the image, the text indicative of the state of one or more vehicle-systems of the particular vehicle,
      - determining, by the one or more processors, one or more electronic control units (ECUs) of the particular vehicle based on the identified text,
      - transmitting, by the communication interface to the one or more ECUs of the particular vehicle based on the identified text, one or more requests for the vehicle-system data, and
      - receiving, by the communication interface of the vehicle repair tool from the one or more ECUs of the particular vehicle, the vehicle-system data;
    - the vehicle-system data indicates at least one of a diagnostic trouble code (DTC) or sensor data detected from a particular vehicle-system of the particular vehicle;
  - using the vehicle-system data and the data stored on the non-transitory computer-readable medium that maps at least one of diagnostic trouble codes or sensor data to candidate vehicle repair procedures to determine a particular candidate vehicle repair procedure that maps to at least one of the DTC or sensor data indicated by the vehicle-system data;
  - subsequent to and in response to determining the particular candidate vehicle repair procedure, transmitting, via the communication interface to a remote server, a second wired or wireless transfer of data, wherein the second wired or wireless transfer of data includes a request for information about whether the particular candidate vehicle repair procedure has been performed on the particular vehicle, wherein the request for information includes data indicative of the particular candidate repair procedure;
  - receiving, via the communication interface from the remote server in response to the request for information, a third wired or wireless transfer of data, wherein the third wired or wireless transfer of data includes other input data indicative of a state of the particular vehicle, wherein the other input data indicates whether the particular vehicle has undergone the particular candidate vehicle repair procedure;
  - determining repair information to be specified in a repair order (RO) associated with the particular vehicle, wherein the repair information includes at least a portion of the vehicle-system data, an indication of the particular candidate vehicle repair procedure that maps to at least one of the DTC or sensor data indicated by the vehicle-system data, and an indication of whether the particular candidate vehicle repair procedure has been performed on the particular vehicle determined from the third wired or wireless transfer of data;
  - generating an RO specifying at least the determined repair information, wherein the generated RO is associated with the particular vehicle; and
  - directing a display device of the vehicle repair tool to display at least one visual indication representative of the generated RO specifying at least the determined repair information.

32. The vehicle repair tool of claim 31, wherein the other input data indicates that the particular vehicle has not undergone the particular candidate vehicle repair procedure, and wherein determining that the particular candidate vehicle repair procedure is to be specified in the RO associated with the particular vehicle comprises determining that the particular vehicle has not undergone the particular candidate vehicle repair procedure.

33. The vehicle repair tool of claim 31, wherein determining a particular candidate vehicle repair procedure comprises determining, using mapping data in the non-transitory computer-readable medium, that the DTC of the vehicle-system data maps to the particular candidate vehicle repair procedure.

34. The vehicle repair tool of claim 31, wherein determining a particular candidate vehicle repair procedure comprises determining, using mapping data in the non-transitory computer-readable medium, that a value of the detected sensor data of the vehicle-system data maps to the particular candidate vehicle repair procedure.

\* \* \* \* \*